(12) United States Patent
Kashiwagi et al.

(10) Patent No.: US 8,521,007 B2
(45) Date of Patent: Aug. 27, 2013

(54) INFORMATION PROCESSING METHOD, INFORMATION PROCESSING DEVICE, SCENE METADATA EXTRACTION DEVICE, LOSS RECOVERY INFORMATION GENERATION DEVICE, AND PROGRAMS

(75) Inventors: Akifumi Kashiwagi, Tokyo (JP); Hideki Noma, Kanagawa (JP); Tsugutomo Enami, Saitama (JP); Yoshihiro Manabe, Tokyo (JP); Yuichi Abe, Tokyo (JP); Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 13/096,508

(22) Filed: Apr. 28, 2011

(65) Prior Publication Data

US 2011/0274406 A1    Nov. 10, 2011

(30) Foreign Application Priority Data

May 10, 2010   (JP) ................. P2010-108223

(51) Int. Cl.
*H04N 9/88*    (2006.01)
*H04N 5/94*    (2006.01)
*H04N 9/885*   (2006.01)
*H04N 5/93*    (2006.01)
*G11B 27/00*   (2006.01)
*G06K 9/40*    (2006.01)
*G06K 9/03*    (2006.01)
*G06K 9/20*    (2006.01)
*G06K 7/10*    (2006.01)

(52) U.S. Cl.
USPC ........... 386/263; 386/264; 386/267; 386/270; 386/278; 386/280; 386/288; 382/254; 382/309; 382/320; 382/321

(58) Field of Classification Search
USPC ................ 382/254, 309, 320, 321; 386/263, 386/264, 267, 270, 278, 280, 288
See application file for complete search history.

(56) References Cited

U.S. PATENT DOCUMENTS

| | | | |
|---|---|---|---|
| 6,304,714 B1 * | 10/2001 | Krause et al. ................. | 386/235 |
| 6,434,323 B1 * | 8/2002 | Hayashi ........................ | 386/323 |
| 6,588,015 B1 * | 7/2003 | Eyer et al. ....................... | 725/89 |
| 6,625,626 B1 * | 9/2003 | Haneda ............................... | 1/1 |
| 7,379,653 B2 * | 5/2008 | Yap et al. ....................... | 386/248 |
| 2007/0230902 A1 * | 10/2007 | Shen et al. ....................... | 386/83 |
| 2008/0225942 A1 * | 9/2008 | Nakamura et al. ........ | 375/240.01 |
| 2008/0284856 A1 * | 11/2008 | Okazaki ..................... | 348/207.99 |
| 2008/0301538 A1 * | 12/2008 | Wang et al. ..................... | 714/819 |
| 2010/0129047 A1 * | 5/2010 | Tsunashima et al. ............ | 386/52 |

* cited by examiner

*Primary Examiner* — Daquan Zhao
(74) *Attorney, Agent, or Firm* — Finnegan, Henderson, Farabow, Garrett & Dunner, LLP

(57) ABSTRACT

An information processing method includes the steps of analyzing moving-image content including image data and audio data, extracting scene metadata characterizing each scene for each scene constituting the moving-image content, deciding a reproduction mode of the moving-image content according to at least one of a reproduction environment of the moving-image content and setting information set by a user, generating loss recovery information for recovering loss information lost by changing the reproduction mode of the moving-image content using the scene metadata according to the decided reproduction mode, and outputting the generated loss recovery information in accordance with the moving-image content to be reproduced in the decided reproduction mode.

9 Claims, 19 Drawing Sheets

FIG.5

| METADATA ||
|---|---|
| BASIC METADATA | SCENE METADATA |
| PROGRAM NAME | TIME BAND INFORMATION |
| CAPTION INFORMATION | SEASONAL INFORMATION |
| BACKGROUND IMAGE INFORMATION | GEOGRAHICAL INFORMATION |
| CHARACTER INFORMATION (NAME / FACE / VOICE / ACTION) | CHARACTER INFORMATION (STATE / FACIAL EXPRESSION) |
| ENVIRONMENTAL SOUND INFORMATION | INTERPERSONAL RELATIONSHIP INFORMATION |
| ⋮ | ⋮ |

FIG.6

| SENSING INFORMATION ||
|---|---|
| EYES | AGE |
| EARS | VIEWING STATE |
| FACE | STATE OF VISUAL ACUITY |
| ACTION | STATE OF HEARING ACUITY |
| VOICE | PHYSICAL STATE |
| POSITION | MENTAL STATE |
| TIME | OTHERS |

FIG.7

| USER SETTING ITEM |
|---|
| NAME |
| AGE (BIRTHDATE) |
| SEX |
| ADDRESS |
| VIEWING TIME |
| DEFAULT REPRODUCTION MODE |
| OTHERS |

FIG.8

| REPRODUCTION MODE OF CONTENT | REPRODUCTION MODE OF LOSS RECOVERY INFORMATION |
|---|---|
| PICTURE-BOOK-LIKE CONTENT (STILL IMAGE+CAPTION) | TELOP |
| PRINT CONTENT (NO STILL IMAGE) | SCENIC TEXT |
| VIDEO CONTENT (MUTE STATE) | TELOP |
| AUDIO CONTENT | NARRATION |

INFORMATION PROCESSING METHOD, INFORMATION PROCESSING DEVICE, SCENE METADATA EXTRACTION DEVICE, LOSS RECOVERY INFORMATION GENERATION DEVICE, AND PROGRAMS

BACKGROUND OF THE INVENTION

1. Field of the Invention

The present invention relates to an information processing method, an information processing device, a scene metadata extraction device, a loss recovery information generation device, and programs.

2. Description of the Related Art

In our daily lives, there are a variety of content reproducing devices. For example, a television, a DVD recorder, a Blu-ray recorder, a personal computer (PC), and the like may be used to reproduce moving-image content, and an audio device and the like may be used to reproduce music content. With the implementation of a small size and a high performance of the above-described devices, more portable terminals such as a gaming machine, a mobile phone, a portable audio player, and an electronic book reader have been introduced. In addition, the number of devices corresponding to various reproduction modes of music and moving images such as a current audio player and mobile phone and the number of pieces of content corresponding to each device are expected to increase in the future.

However, while the number of reproduction modes corresponding to each device is increased, a reproduction mode or an audiovisual environment of a user even for the same content is different, and thus a problem of a difference in a level of understanding of content by the user is not yet improved. A noise cancellation technique or the like has been proposed as a method of improving an audiovisual environment in which it is difficult to hear an audio sound due to external noise, but this technique only excludes a factor that hinders the reproduction of content and is incapable of compensating for the loss of information due to a change of a reproduction mode.

As one improvement upon this problem, a method of generating a character string from speech spoken by a person appearing on content and presenting the character string to a user has been proposed as shown in Japanese Patent Application Laid-Open No. 63-40936. For example, audio data is capable of being converted into book-like text-based data using this technique.

SUMMARY OF THE INVENTION

However, if moving-image content is converted into text data using the technique related to Japanese Patent Application Laid-Open No. 63-40936, only words spoken within content such as a narration, a dialogue, or the like become a target. Thus, all pieces of content indicating a facial expression of a character standing speechless in a certain scene, who is standing with the character, whether the scene is in the morning or evening, and where the character is, not included in a narration or dialogue of scene information, are lost when a reproduction mode is changed.

In light of the foregoing, it is desirable to provide an information processing method, an information processing device, a scene metadata extraction device, a loss recovery information generation device, and programs that can recover information lost from audio data and video data when a reproduction mode is changed.

According to an embodiment of the present invention, there is provided an information processing method including the steps of analyzing moving-image content including image data and audio data and extracting scene metadata characterizing each scene for each scene constituting the moving-image content, deciding a reproduction mode of the moving-image content according to at least one of a reproduction environment of the moving-image content and setting information set by a user, generating loss recovery information for recovering loss information lost by changing the reproduction mode of the moving-image content using the scene metadata according to the decided reproduction mode, and outputting the generated loss recovery information in accordance with the moving-image content to be reproduced in the decided reproduction mode.

In the step of extracting the scene metadata, first metadata is preferably extracted from the moving-image content, and the scene metadata derived from the image data and the scene metadata derived from the audio data are extracted using the first metadata.

In the step of generating the loss recovery information, the loss recovery information may be generated mainly using scene metadata derived from data that is not output by a change of the reproduction mode.

The reproduction environment of the moving-image content may be decided on the basis of a sensor output, which is output from at least one of a camera that images the user or a surrounding environment, a sound collecting microphone that acquires a surrounding environmental sound, a sensor that senses a motion of the user, and a sensor that acquires information representing a current position.

In the step of outputting the loss recovery information, an output mode may be decided when the loss recovery information is output according to the reproduction mode.

According to another embodiment of the present invention, there is provided an information processing device including a scene metadata extraction unit for analyzing moving-image content including image data and audio data, and extracting scene metadata characterizing each scene for each scene constituting the moving-image content, a reproduction mode decision unit for deciding a reproduction mode of the moving-image content according to at least one of a reproduction environment of the moving-image content and setting information set by a user, a loss recovery information generation unit for generating loss recovery information for recovering loss information lost by changing the reproduction mode of the moving-image content using the scene metadata according to the reproduction mode decided by the reproduction mode decision unit, and a loss recovery information output unit for outputting the loss recovery information generated by the loss recovery information generation unit in accordance with the moving-image content to be reproduced in the reproduction mode decided by the reproduction mode decision unit.

According to another embodiment of the present invention, there is provided a scene metadata extraction device including a scene metadata extraction unit for analyzing moving-image content including image data and audio data, and extracting scene metadata characterizing each scene for each scene constituting the moving-image content, and a data output unit for mutually associating and outputting the moving-image content and the scene metadata extracted by the scene metadata extraction unit.

According to another embodiment of the present invention, there is provided a loss recovery information generation device including a scene metadata acquisition unit for acquiring scene metadata characterizing each scene constituting moving-image content including image data and audio data, a reproduction mode decision unit for deciding a reproduction mode of the moving-image content according to at least one of a reproduction environment of the moving-image content and setting information set by a user, a loss recovery information generation unit for generating loss recovery information for recovering loss information lost by changing the reproduction mode of the moving-image content using the scene metadata according to the reproduction mode decided by the reproduction mode decision unit, and a loss recovery information output unit for outputting the loss recovery information generated by the loss recovery information generation unit in accordance with the moving-image content to be reproduced in the reproduction mode decided by the reproduction mode decision unit.

According to another embodiment of the present invention, there is provided a program for causing a computer to implement a scene metadata extraction function of analyzing moving-image content including image data and audio data, and extracting scene metadata characterizing each scene for each scene constituting the moving-image content, a reproduction mode decision function of deciding a reproduction mode of the moving-image content according to at least one of a reproduction environment of the moving-image content and setting information set by a user, a loss recovery information generation function of generating loss recovery information for recovering loss information lost by changing the reproduction mode of the moving-image content using the scene metadata according to the reproduction mode decided by the reproduction mode decision function, and a loss recovery information output function of outputting the loss recovery information generated by the loss recovery information generation function in accordance with the moving-image content to be reproduced in the reproduction mode decided by the reproduction mode decision function.

According to another embodiment of the present invention, there is provided a program for causing a computer to implement a scene metadata extraction function of analyzing moving-image content including image data and audio data, and extracting scene metadata characterizing each scene for each scene constituting the moving-image content, and a data output function of mutually associating and outputting the moving-image content and the scene metadata extracted by the scene metadata extraction function.

According to another embodiment of the present invention, there is provided a program for causing a computer to implement a scene metadata acquisition function of acquiring scene metadata characterizing each scene constituting moving-image content including image data and audio data, a reproduction mode decision function of deciding a reproduction mode of the moving-image content according to at least one of a reproduction environment of the moving-image content and setting information set by a user, a loss recovery information generation function of generating loss recovery information for recovering loss information lost by changing the reproduction mode of the moving-image content using the scene metadata according to the reproduction mode decided by the reproduction mode decision function, and a loss recovery information output function of outputting the loss recovery information generated by the loss recovery information generation function in accordance with the moving-image content to be reproduced in the reproduction mode decided by the reproduction mode decision function.

According to the present invention as described above, information lost from audio data and video data can be recovered when a reproduction mode is changed.

BRIEF DESCRIPTION OF THE DRAWINGS

FIG. 5 is an illustrative diagram illustrating the information processing device according to the same embodiment;

FIG. 6 is an illustrative diagram illustrating the information processing device according to the same embodiment;

FIG. 7 is an illustrative diagram illustrating the information processing device according to the same embodiment;

FIG. 8 is an illustrative diagram illustrating the information processing device according to the same embodiment;

DETAILED DESCRIPTION OF THE EMBODIMENT(S)

Figure 1:
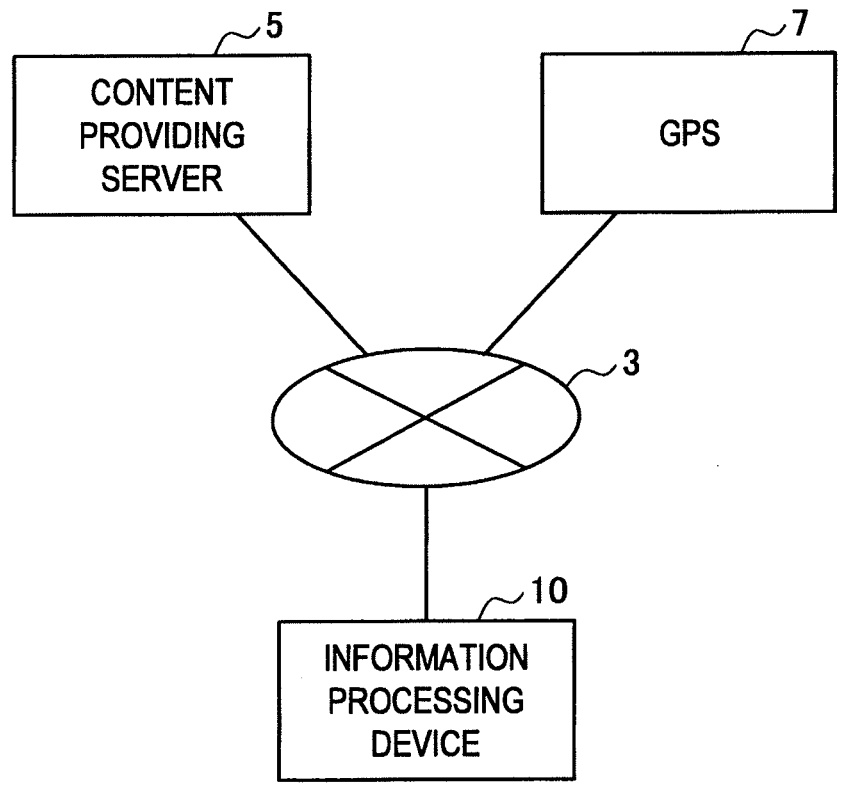
FIG. 1 is an illustrative diagram showing an information processing system according to a first embodiment of the present invention.

Hereinafter, preferred embodiments of the present invention will be described in detail with reference to the appended drawings. In this specification and the drawings, elements having substantially the same functional configurations are denoted by the same reference numerals, and redundant description thereof is omitted.

Description will be given in the following order.
(1) First Embodiment
　(1-1) Information Processing System
　(1-2) Configuration of Information Processing System
　(1-3) Specific Example of Scene Metadata and Loss Recovery Information Generation Processing
　(1-4) Information Processing Method
(2) Second Embodiment
　(2-1) Information Processing System (2-2) Configuration of Scene Metadata Extraction Device
(2-3) Configuration of Loss Recovery Information Generation Device
(3) Hardware Configuration of Information Processing Device according to Embodiment of Present Invention
(4) Summary First Embodiment <Information Processing System>

First, an information processing system according to a first embodiment of the present invention will be described with reference to FIG. 1. FIG. 1 is an illustrative diagram showing an information processing system 1 according to this embodiment.

The information processing system 1 according to this embodiment at least includes a network 3, and a content providing server 5, a global positioning system (GPS) 7 and an information processing device 10 communicable with each other by the network 3.

The network 3 is a communication line network that enables the content providing server 5, the GPS 7, and the information processing device 10 to perform two-way communication with each other. For example, the network is constituted of a public line network such as the Internet, a telephone line network, a satellite communication network, a broadcast communication path, or the like, or a dedicated line network such as a wide area network (WAN), a local area network (LAN), an Internet protocol-virtual private network (IP-VPN), Ethernet (registered trademark), a wireless LAN, or the like, regardless of a wired/wireless type.

The content providing server 5 is a server that manages moving-image content including image data and audio data varying with time. Managed real data of moving-image content is provided to the information processing device 10 according to this embodiment. The content providing server 5 may manage various metadata associated with the moving-image content as well as the real data of the moving-image content. In this case, the content providing server 5 can provide the information processing device 10 with the metadata associated with the moving-image content along with the real data of the moving-image content.

An example of the content providing server 5 may be a server that provides a TV broadcast or an IPTV broadcast, a server that distributes various contents to a user, or the like. The content providing server 5 may be a server connected to a public network such as the Internet or may be various devices having a server function provided on a home network.

The GPS 7 is a system used to specify a position on the Earth on the basis of a signal transmitted from a GPS satellite. The information processing device 10 can calculate position information representing a current position on the Earth by receiving a plurality of signals transmitted from the GPS satellite. The information processing device 10 may implement various functions, or may provide various functions to other devices, using the calculated position information.

The information processing device 10 is a device that reproduces a moving image acquired from the content providing server 5 or the like according to various reproduction modes. If reproduction is performed according to a reproduction mode other than a reproduction mode of reproducing the moving-image content as a moving image, the information processing device 10 can change the moving-image content reproduction mode.

Figure 2:
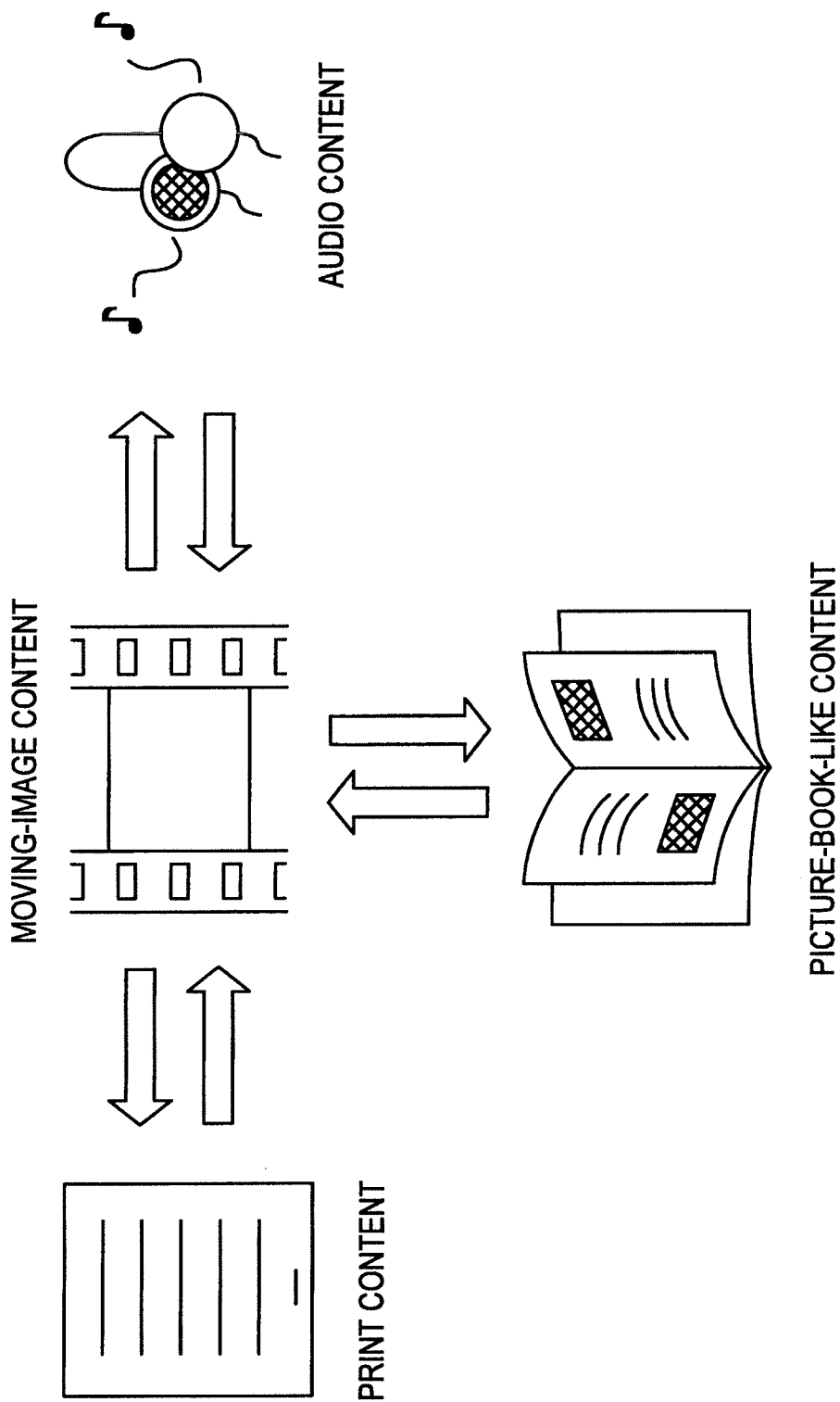
FIG. 2 is an illustrative diagram illustrating an information processing device according to the same embodiment.

FIG. 2 is an illustrative diagram illustrating a change of a mode of moving-image reproduction that is performed by the information processing device 10. As shown in FIG. 2, the information processing device 10 can convert moving-image content including an image and an audio sound into audio content including only the audio sound. The information processing device 10 can convert the moving-image content into picture-book-like content including a still image and printed words (further, comic-like content as well as a picture book). The information processing device 10 can convert the moving-image content into print content including only printed words. An example shown in FIG. 2 is an example of reproduction mode change processing that is performed by the information processing device 10. As described below, the information processing device 10 can convert the moving-image content into a reproduction mode other than the reproduction modes shown in FIG. 2.

When the reproduction mode is changed as described above, there is a possibility that part of information included in the moving-image content may be lost. In particular, if a conversion target is the moving-image content, there is a problem in that a level of understanding of content of the user is significantly lowered as compared to when the content is viewed in the original reproduction mode since all visual information is lost in a state in which no video is viewed. This is also supported by the law of Mehrabian that a human being is most sensitive to information from a visual sense.

In order to recover the lost information, the information processing device 10 according to this embodiment generates replacement information for compensating for the loss of information. That is, the information processing device 10 generates scene metadata to be described below in detail for each scene constituting moving-image content and also generates information that recovers lost content using the generated scene metadata. If a content reproduction mode is changed, the information processing device 10 generates information for recovering the lost content for information that is likely to be lost due to conversion using the scene metadata, and reproduces the information for recovering the lost content along with content after the conversion. Thereby, the information processing device 10 can suppress the loss of information due to the conversion even in the case where a content reproduction mode is changed, and can prevent the phenomenon that it is difficult for the user to understand content.

The information processing device 10 according to this embodiment may be implemented as a computer such as a PC or various servers, or may be implemented as a portable electronic device such as a portable music player, a portable gaming machine, a mobile phone, a smart phone, a PDA, or a touch screen tablet. The information processing device 10 according to this embodiment may be implemented as various recorders such as a television, a DVD recorder, a Blu-ray recorder, and the like.

Figure 3:
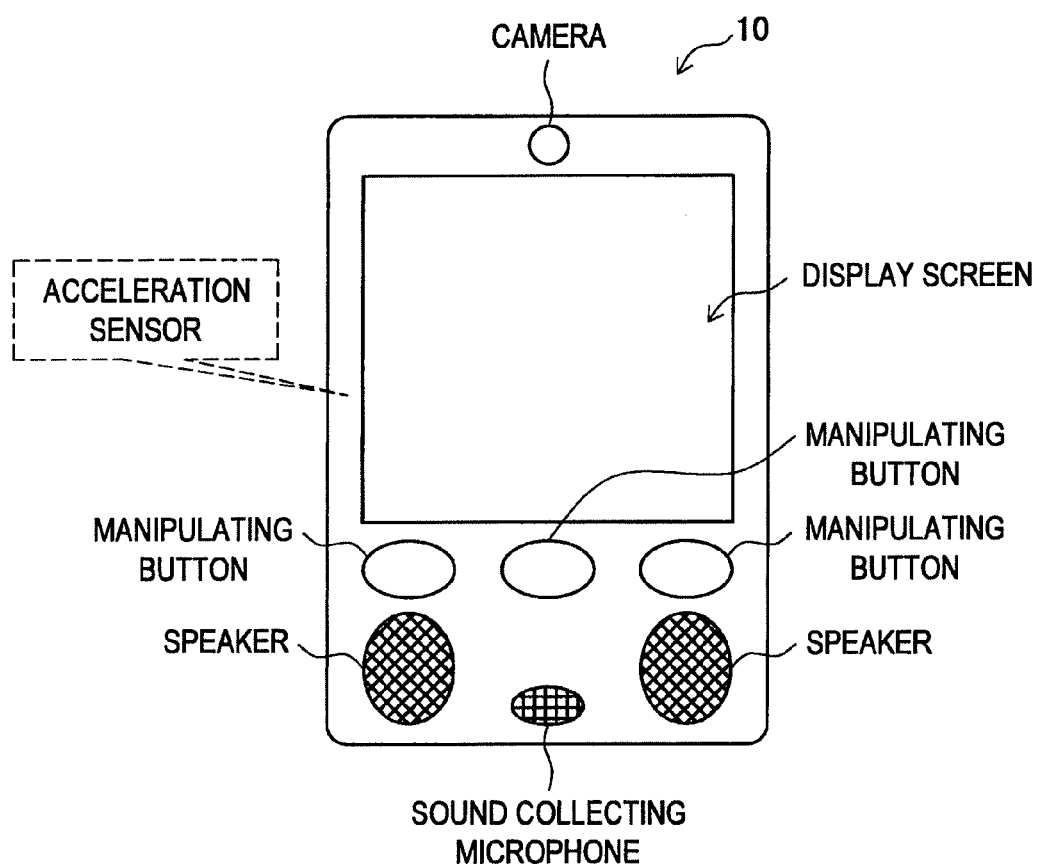
FIG. 3 is an illustrative diagram showing an example of the information processing device according to the same embodiment.

Hereinafter, an example in which the information processing device 10 according to this embodiment is a portable electronic device as shown in FIG. 3 will be described. FIG. 3 is an illustrative diagram showing an example of the information processing device 10 according to this embodiment.

As illustrated in FIG. 3, the information processing device 10 according to this embodiment includes a display screen on which various pieces of information including content are displayed, manipulating buttons for manipulating the information processing device 10, and speakers that are output devices from which audio sounds are output. Here, the display screen may include a touch panel that is an input device.

Various sensors for sensing a state of the user or surroundings may be provided in the information processing device 10. For example, an example of the sensors may be a camera that images the user or a surrounding environment or a sound collecting microphone that acquires an environmental sound. Besides these sensors, a sensor that senses a motion of the user (hereinafter, also referred to as a motion sensor) and a sensor that acquires information representing a current position (hereinafter, also referred to as a position sensor) may be used.

Here, for example, the motion sensor may be a 3-axis acceleration sensor (here, including an acceleration sensor, a gravity sensor, a fall detection sensor, and the like) or a 3-axis gyro-sensor (here, including an angular velocity sensor, a camera-shake correction sensor, a geomagnetic sensor, and the like). For example, the position sensor may be a GPS sensor that receives data output from a GPS. Here, it is possible to use the above-described sensor as the position sensor so as to detect a latitude/altitude of a current location from information of radio frequency identification (RFD), a Wi-Fi access point, or a wireless base station.

The information processing device 10 may not include all these sensors, or may not include a sensor at all.

The information processing system 1 according to this embodiment has been briefly described above. In the information processing system 1 according to this embodiment, a search engine capable of searching for various pieces of information, a search server for managing a database or the like, or the like may be included.

<Configuration of Information Processing Device>

Figure 4:
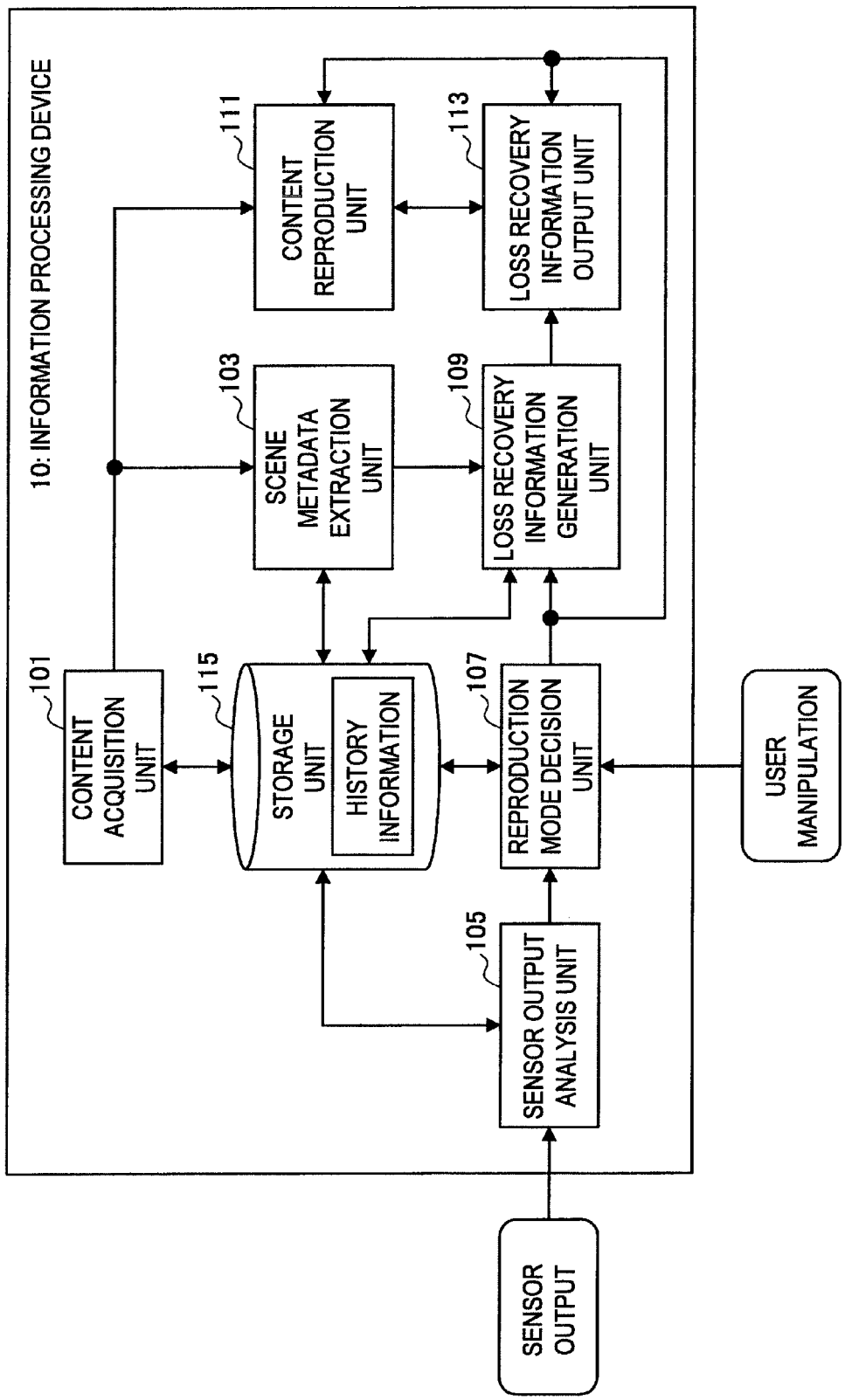
FIG. 4 is a block diagram showing a configuration of the information processing device according to the same embodiment.

Next, the configuration of the information processing device according to this embodiment will be described with reference to FIG. 4. FIG. 4 is a block diagram showing the configuration of the information processing device 10 according to this embodiment.

The information processing device 10 according to this embodiment mainly includes a content acquisition unit 101, a scene metadata extraction unit 103, a sensor output analysis unit 105, a reproduction mode decision unit 107, a loss recovery information generation unit 109, a content reproduction unit 111, a loss recovery information output unit 113, and a storage unit 115.

For example, the content acquisition unit 101 is implemented by a central processing unit (CPU), a read only memory (ROM), a random access memory (RAM), a communication device, or the like. The content acquisition unit 101 acquires moving-image content including image data and audio data from the content providing server 5 or a device mutually communicable with the information processing device 10. The content acquisition unit 101 can acquire metadata associated with the moving-image content along with the moving-image content. The metadata of the moving-image content may be associated with, or embedded in, real data of the moving-image content itself. The content acquisition section 101 may acquire the metadata of the moving-image content from a position (for example, a search server or a metadata management database of EPG or the like) different from a content acquisition destination.

The content acquisition unit 101 may store the real data or the metadata of the acquired moving-image content in the storage unit 115 or the like. The content acquisition unit 101 may output the real data and the metadata of the acquired moving-image content to the scene metadata extraction unit 103 and the content reproduction unit 111 to be described later.

For example, the scene metadata extraction unit 103 is implemented by a CPU, a ROM, a RAM, a communication device, or the like. The scene metadata extraction unit 103 extracts feature metadata characterizing each scene for each scene constituting the moving-image content by analyzing the real data of the moving-image content output from the content acquisition unit 101. The scene metadata extraction unit 103 can use the metadata output from the content acquisition unit 101 upon extraction of the scene metadata.

Here, metadata capable of being extracted from the moving-image content will be briefly described with reference to FIG. 5. FIG. 5 is an illustrative diagram illustrating the metadata.

In the present invention, the metadata capable of being extracted from the moving-image content may be broadly divided into two types of basic metadata and scene metadata as shown in FIG. 5.

Here, the basic metadata is obtained by analyzing the moving-image content or the metadata pre-associated with the moving-image content. The basic metadata is data obtained without further processing an analysis result, and is a kind of primary information obtained by analyzing the moving-image content. As shown in FIG. 5, an example of the basic metadata is a content program name, information regarding a caption (caption information), information regarding a background image (background image information), information regarding a name, a face, voice, and action of a character (character information), information regarding an environmental sound (environmental sound information), or the like. In the above-described information, the caption information, the background image information, the character information, the environmental sound information, and the like are in each scene constituting the content. Besides the above-described information, the metadata obtained by analyzing the moving-image content (or the majority of the metadata pre-associated with the content) may correspond to the basic metadata.

The scene metadata is in each scene constituting the moving-image content, and is metadata characterizing each scene. The scene metadata is obtained from a result of analyzing each scene of content, and is generated using the above-described basic metadata. An example of characterizing each scene may be character states, interactions between characters, surrounding environments (including a background image or BGM) of the characters, or the like. More specifically, as shown in FIG. 5, the scene metadata is information regarding a time band of a scene (time band information), information regarding a season of a scene (seasonal information), geographical information, information regarding states or facial expressions of characters (character information), interpersonal relationship information, or the like. Besides the above-described information, information obtained by analyzing each scene or information generated on the basis of the basic metadata may be regarded to correspond to the scene metadata.

The scene metadata extraction unit 103 first extracts the basic metadata by analyzing the real data of the moving-image content output from the content acquisition unit 101 or the metadata associated with the content. Thereafter, the scene metadata extraction unit 103 extracts the scene metadata using the extracted basic metadata. Hereinafter, a specific method of extracting the scene metadata will be described with reference to a specific example.

If the extracted scene metadata is arranged for each scene, the scene metadata extraction unit 103 outputs the arranged extracted scene metadata to the loss recovery information generation unit 109 to be described later. The scene metadata extraction unit 103 may record an arrangement result on the storage unit 115 or the like in the form of a database, a look-up table, or the like.

Scene metadata extraction processing may be performed at the timing when the information processing device 10 acquires new moving-image content, may be periodically performed every predetermined period, or may be performed simultaneously in parallel with content reproduction in accordance with the content reproduction. That is, it is preferable to appropriately perform the scene metadata extraction processing depending upon resources available in processing by the information processing device 10.

For example, the sensor output analysis unit 105 is implemented by a CPU, a ROM, a RAM, a communication device, or the like. The sensor output analysis unit 105 analyzes information (sensor information) output from a mounted sensor if the above-described sensor is mounted on the information processing device 10. The sensor output analysis unit 105 analyzes what is a reproduction environment of moving-image content including information regarding a state of the user or information regarding a surrounding environment of the user in a range of sensor information capable of being acquired, and outputs an obtained analysis result to the reproduction mode decision unit 107 to be described later.

For example, information obtained from the analysis result by the sensor output analysis unit 105 (hereinafter, also referred to as sensing information) is shown in FIG. 6. That is, the sensing information includes information regarding a physical state of the user such as information regarding eyes according to imaging of the eyes of the user, information regarding ears of the user, and information regarding a face according to imaging of the face of the user. The sensor output analysis unit 105 may further analyze high-level information such as information regarding visual acuity or hearing acuity of the user (whether the user has a visual or aural handicap), information regarding a physical state or a mental state of the user, or the like as the information regarding the physical state of the user.

The sensor output analysis unit 105 may further extract information regarding the age or sex of the user using, for example, an imaging result of the face of the user. The sensor output analysis unit 105 may recognize the action (gesture) such as sign language, a blink, or the like performed by the user by analyzing an output from the camera and obtain information regarding the action of the user. The sensor output analysis unit 105 may specify the motion of the user such as the user walking, stopping, sitting, being on a train or like by analyzing an output from the motion sensor, or the like and obtain information regarding the action of the user. The sensor output analysis unit 105 may further perform pattern recognition for the presence/absence of a specific tune (melody, humming, or the like) by analyzing an output from a sound collecting microphone and obtain information regarding a sound. The sensor output analysis unit 105 can further designate information regarding a time, position information acquired from a GPS or the like, or information regarding a movement history of the user as the sensing information.

The sensor output analysis unit 105 can use information obtained by analyzing sensor outputs obtained from various sensors as the sensing information, in addition to the information shown in FIG. 6.

The sensor output analysis unit 105 outputs the sensing information obtained as described above to the reproduction mode decision unit 107 to be described later. History information regarding the obtained sensing information may be stored in the storage unit 115 or the like to be described later.

For example, the reproduction mode decision unit 107 is implemented by a CPU, a ROM, a RAM, or the like. The reproduction mode decision unit 107 decides a mode of reproducing moving-image content on the basis of the sensing information output from the sensor output analysis unit 105, preset setting information, input information input by user manipulation, or the like. Thereby, the reproduction mode decision unit 107 decides a reproduction mode considered to be best in a moving-image reproduction environment including information regarding a state of the user, information regarding a surrounding environment of the user, or the like.

Here, if there is user manipulation to designate the moving-image content reproduction mode, the reproduction mode decision unit 107 decides a reproduction mode designated by the user manipulation as the moving-image content reproduction mode.

If there is no user manipulation to designate the reproduction mode, the reproduction mode decision unit 107 decides a reproduction mode suitable for the reproduction environment in response to the setting information set by the user or the sensing information output from the sensor output analysis unit 105.

Here, items of the setting information set by the user are not particularly limited, but, for example, items included in FIG. 7 may be considered as the user setting items. That is, the user setting items are information designating a viewing time and information designating a default reproduction mode, in addition to information specifying the user such as a name, age (birthdate), sex, and address of the user, and the like. For example, a time in which moving-image content can be viewed such as 30 minutes, 1 hour, or the like is written in the information designating the viewing time. For example, the information processing device 10 according to this embodiment can set the number of frames or the like when the moving-image content is reproduced by performing conversion into picture-book-like content so that all pieces of the moving-image content can be viewed within the set time using the above-described information.

The reproduction mode decision unit 107 can decide a reproduction mode using the sensing information. For example, if information regarding a volume of a surrounding sound is equal to or greater than a predetermined threshold value, the reproduction mode decision unit 107 can determine a situation in which an audio sound may be output, and can select a reproduction mode in which the audio sound is output along with an image. If the volume of the surrounding sound is less than the predetermined threshold value, the reproduction mode decision unit 107 can determine a situation in which an audio sound output is likely to be troublesome to surroundings, and can select a reproduction mode in which no audio sound is output. Using position information as one piece of the sensing information, the reproduction mode decision unit 107 may check a specific place where the user is located, for example, by searching for a place indicated by the position information in a search server or the like. The reproduction mode decision unit 107 may decide a reproduction mode by considering the specific place specified from the position information. For example, if it is determined that the user is in a situation in which an audio sound output should be limited, such as in a library, by searching for the position information, the reproduction mode decision unit 107 can select a reproduction mode in which no audio sound is output in response to such a determination result.

It is preferable to appropriately set an algorithm of determining a reproduction mode using the above-described sensing information, and the present invention is not limited to the above-described example.

When the reproduction mode is decided, priority to any of designation by user manipulation, sensing information, and setting information can be appropriately set. However, it is preferable to give priority to designation by user manipulation in the sense that priority is given to the user's will on the spot.

If the reproduction mode is decided as described above, the reproduction mode decision unit 107 outputs information indicating the decided reproduction mode to the loss recovery information generation unit 109, the content reproduction unit 111, and the loss recovery information output unit 113 to be described later. The user may store history information of the decided reproduction mode or history information regarding a base for selecting the decided reproduction mode in the storage unit 115 or the like. It is possible to more appropriately perform a determination when the next and subsequent reproduction modes are decided by storing the history information and updating the determination algorithm.

For example, the loss recovery information generation unit 109 is implemented by a CPU, a ROM, a RAM, a communication device, or the like. When content is reproduced after conversion by changing a reproduction mode of moving-image content, the loss recovery information generation unit 109 generates information for recovering information lost by the change of the reproduction mode.

For example, the case where the reproduction mode of moving-image content is changed to a reproduction mode in which only an audio sound is output may be considered. In this case, various pieces of information provided to the user using a video from the original moving-image content are lost by the change of the reproduction mode. In this case, such information becomes loss information. The loss recovery information generation unit 109 generates information provided to the user using the video from the original moving-image content and lost by the change as the loss recovery information. In this case, it goes without saying that the loss recovery information to be generated is generated as information to be provided to the user using the audio sound.

The case where the reproduction mode of moving-image content is changed to the reproduction mode in which only a video is output may be considered. In this case, various pieces of information provided to the user using an audio sound from the original moving-image content are lost by the change of the reproduction mode. In this case, such information becomes loss information. The loss recovery information generation unit 109 generates information provided to the user using the audio sound from the original moving-image content and lost by the change as the loss recovery information. In this case, it goes without saying that the loss recovery information to be generated is generated as information to be provided to the user using a video such as a caption displayed on a screen, or the like.

FIG. 8 is a diagram showing an example of a correspondence relationship between a reproduction mode of content and a reproduction mode of loss recovery information. If the reproduction mode of moving-image content is changed to picture-book-like content (that is, content to be reproduced in still images and captions) as shown in FIG. 8, the loss recovery information to be generated is output as a telop on the display screen. If the reproduction mode is changed to print content (that is, content having no still or moving image), the loss recovery information to be generated is output as text describing a scene. If the reproduction mode is changed to video content in a mute state, the loss recovery information to be generated is output as a telop on a display screen. If the moving-image content is converted into audio content, the loss recovery information to be generated is output as a narration (that is, audio information).

As described above, the loss recovery information is obtained by expressing information that is likely to be lost when the reproduction mode is changed in a separate format by considering whether the reproduction mode of content is visual or auditory or is a moving image or a still image. Thus, the loss recovery information is output in the form of a telop in which text is displayed on the display screen in terms of valid visual information, or is output in the form of a narration in terms of valid auditory information.

As described above, the loss recovery information generation unit 109 generates the loss recovery information in response to information representing a reproduction mode output from the reproduction mode decision unit 107. In this case, the loss recovery information generation unit 109 generates the loss recovery information using at least scene metadata output from the scene metadata extraction unit 103. When the loss recovery information is generated, the loss recovery information generation unit 109 can generate the loss recovery information using various pieces of information acquired via a network such as basic metadata, a search result by the search server, or the like as well as scene metadata.

A method of generating the loss recovery information is not particularly limited. For example, it is possible to generate the loss recovery information by generating a character string with which scene metadata output from the scene metadata extraction unit 103 is combined or by further converting the character string into an audio sound. Any well-known method is available as a method of generating an audio sound by a read speech from a character string, but, for example, a technique proposed in Japanese Patent Application Laid-Open No. 10-161847 is available.

If the loss recovery information is generated in a format suitable for the reproduction mode as described above, the loss recovery information generation unit 109 outputs the generated loss recovery information to the loss recovery information output unit 113 to be described later. It is preferable for the loss recovery information generation unit 109 to store the loss recovery information generated as described above in the storage unit 115 or the like to be described later. Thereby, if the moving-image content having the loss recovery information is re-output in a reproduction mode suitable for the stored loss recovery information, it is possible to suppress the load of newly generating the loss recovery information by reusing the stored loss recovery information.

The loss recovery information stored in the storage unit 115 or the like is available when loss recovery information of another scene is generated. It is possible to generate loss recovery information considering a transition between scenes using loss recovery information of another scene and loss recovery information of a focused scene.

The loss recovery information generation unit 109 may generate the loss recovery information so that moving-image content can be recovered and reproduced from a location of a selected frame by embedding a moving-image reproduction link or an audio link of a corresponding scene in each frame of picture-book-like content. The loss recovery information generation unit 109 can decide a frame rate upon conversion into picture-book-like content on the basis of information from a network such as the Internet, a viewing rate, or a sound climax level. If the loss recovery information is generated as a narration, the loss recovery information generation unit 109 may further select a user-desired sound using a template or the like.

For example, the content reproduction unit 111 is implemented by a CPU, a ROM, a RAM, a communication device, or the like. The content reproduction unit 111 refers to information indicating a reproduction mode of content output from the reproduction mode decision unit 107 and reproduces moving-image content in the corresponding reproduction mode. If the reproduction mode corresponding to the information output from the reproduction mode decision unit 107 is different from the original reproduction mode of the moving-image content, the content reproduction unit 111 reproduces the content by converting the content into the corresponding reproduction mode.

The content reproduction unit 111 can dynamically change a frame rate of picture-book-like content by referring to a preset viewing time of content and viewing speed of the user.

Here, if content for which reproduction mode change processing has been performed is reproduced, the content reproduction unit 111 performs content reproduction processing after conversion in cooperation with the loss recovery information output unit 113 to be described later. Thereby, it is possible to reproduce content while inserting information for recovering content lost by conversion into an appropriate scene.

For example, the loss recovery information output unit 113 is implemented by a CPU, a ROM, a RAM, or the like. The loss recovery information output unit 113 outputs loss recovery information generated by the loss recovery information generation unit 109 in a format suitable for a reproduction mode output from the reproduction mode decision unit 107 (that is, a reproduction mode as shown in FIG. 8). Here, when the loss recovery information is output, the loss recovery information generation unit 109 outputs loss recovery information suitable for a scene to be reproduced by the content reproduction unit 111 in cooperation with the content reproduction unit 111.

The loss recovery information output unit 113 can also output loss recovery information considering a feature of the user using the analysis result by the sensor output analysis unit 105. For example, if the content reproduction mode is changed to picture-book-like content, it is possible to convert loss recovery information given as a telop into hiragana characters, or change a character size, in response to age or physical information of the user. The loss recovery information output unit 113 may change a frame rate of the picture-book-like content or the number of telops to be displayed in accordance with a viewing time or viewing speed of the user so that content viewing is completed during movement to a destination set by the user.

The storage unit 115 is an example of a storage device provided in the information processing device 10 according to this embodiment. In the storage unit 115, various pieces of history information such as history information regarding moving-image content reproduction, history information regarding moving-image content conversion processing, and the like is recorded. In the storage unit 115, various dictionaries or databases and the like to be used by the scene metadata extraction unit 103 are recorded. In the storage unit 115, various parameters or progress during processing, and the like which are required to be stored when the information processing device 10 according to this embodiment performs any processing, various databases, or the like are appropriately recorded.

Each processing unit provided in the information processing device 10 according to this embodiment can freely perform a read/write operation in the storage unit 115.

<Configuration of Scene Metadata Extraction unit>

Figure 9:
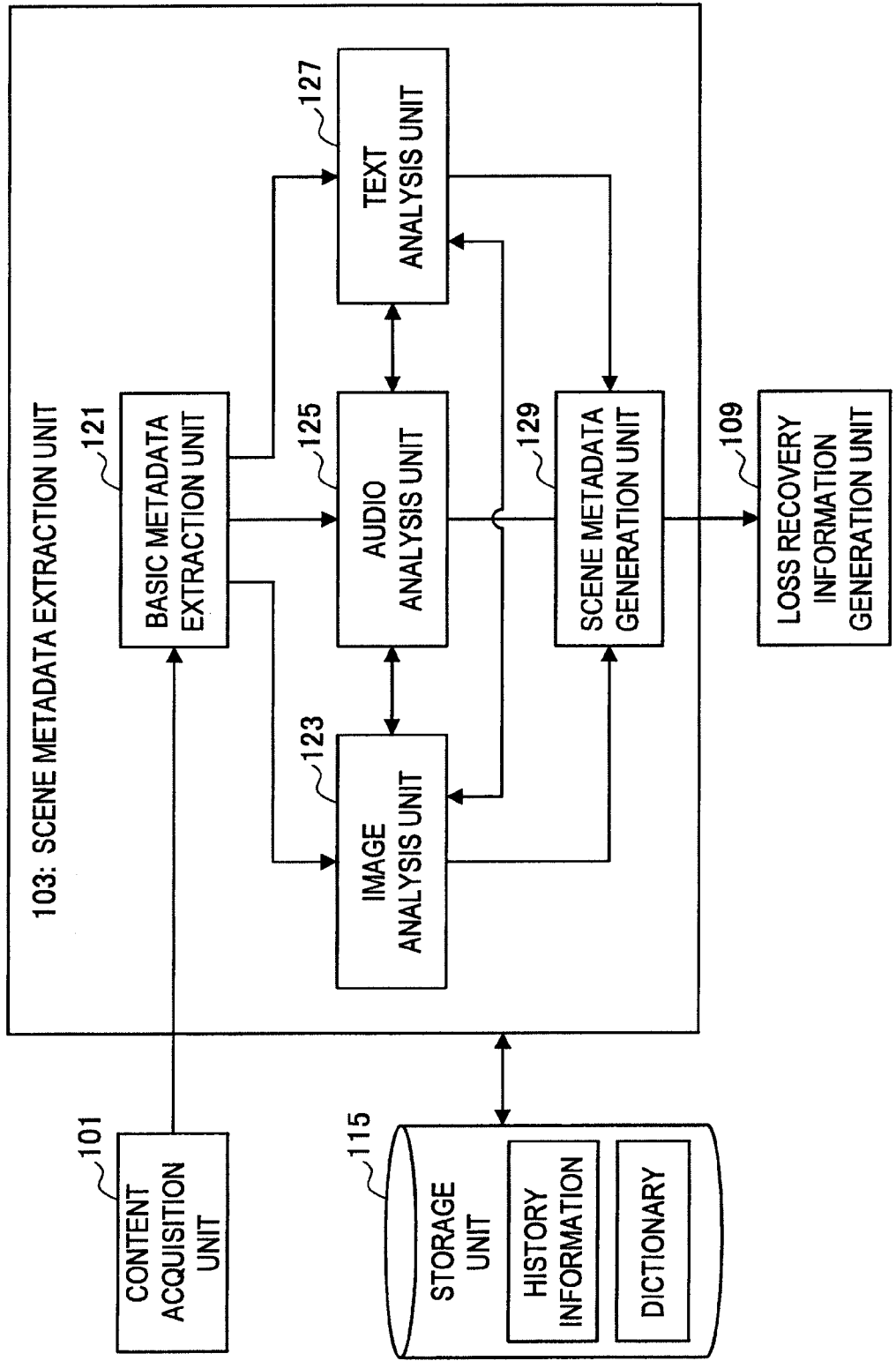
FIG. 9 is a block diagram showing a configuration of a scene metadata extraction unit according to the same embodiment.

Subsequently, a detailed configuration of the scene metadata extraction unit according to this embodiment will be described with reference to FIG. 9. FIG. 9 is a block diagram showing the configuration of the scene metadata extraction unit according to this embodiment.

As shown in FIG. 9, the scene metadata extraction unit 103 according to this embodiment further includes a basic metadata extraction unit 121, an image analysis unit 123, an audio analysis unit 125, a text analysis unit 127, and a scene metadata generation unit 129.

For example, the basic metadata extraction unit 121 is implemented by a CPU, a ROM, a RAM, a communication device, or the like. The basic metadata extraction unit 121 extracts basic metadata as shown in FIG. 5 from moving-image content output from the content acquisition unit 101. The basic metadata extraction unit 121 may acquire basic metadata from various databases provided in the outside. The basic metadata extraction unit 121 outputs the extracted basic metadata to the image analysis unit 123, the audio analysis unit 125, and the text analysis unit 127 to be described later along with real data of the content output from the content acquisition unit 101. It is preferable for the basic metadata extraction unit 121 to record the extracted basic metadata in the storage unit 115 or the like.

For example, the image analysis unit 123 is implemented by a CPU, a ROM, a RAM, a communication device, or the like. The image analysis unit 123 analyzes image data constituting the content using the real data of the content and the basic metadata output from the basic metadata extraction unit 121.

First, the image analysis unit 123 performs processing of separating a person included in a still image, an object such as a physical object, and a background image in the still image of each scene constituting the content. The object separation processing is implemented by performing well-known facial recognition processing, physical-body recognition processing, or moving-body recognition processing, or the like after a high pass filter is applied to still-image data. Thereafter, the image analysis unit 123 uses various dictionary files stored in the storage unit 115 or the like or a search server present on a network or the like, and performs processing of specifying element data from a still image in terms of the obtained object. The image analysis unit 123 may calculate an index representing a co-occurrence relationship of characters (that is, an interpersonal relationship), when necessary.

The image analysis unit 123 performs processing of separating a background image by applying a low pass filter to the still-image data. Thereafter, the image analysis unit 123 performs processing of specifying a numerical value representing the brightness of the background image or specifying an average color value or a color temperature in the obtained background image.

For example, a type of element data obtained from the still image may be a distinction of a background, a face of a person, a background object, a telop, or the like, a name of an object, or the like. The background includes information of brightness, color, color temperature, or the like from which a time band, weather, a season, or the like of a target scene may be estimated. A name, a state of a mouth angle (upward, downward, or the like), and a lip motion can be acquired from the face of the person. Thereby, the image analysis unit 123 can specify a facial expression of the person. Besides the above-described information, the image analysis unit 123 can also analyze the gestures of a character.

The image analysis unit 123 can perform each processing in mutual cooperation with the audio analysis unit 125 and the text analysis unit 127 to be described later.

The image analysis unit 123 outputs an analysis result of image data constituting the content to the scene metadata generation unit 129 to be described later. The image analysis unit 123 may store the obtained analysis result in the storage unit 115 in the form of a database, a look-up table, or the like, and may store history information regarding the analysis result in the storage unit 115.

For example, the audio analysis unit 125 is implemented by a CPU, a ROM, a RAM, a communication device, or the like. The audio analysis unit 125 analyzes audio data constituting the content using the real data of the content and the basic metadata output from the basic metadata extraction unit 121.

The audio analysis unit 125 extracts audio data v1 of a period in which a face is detected by the image analysis unit 123 by analyzing audio data constituting moving-image content. The audio analysis unit 125 extracts audio data v2 of a period in which the mouse of the detected face moves during the period in which the face is detected. Furthermore, the audio analysis unit 125 calculates a difference V between the audio data v2 and the audio data v1.

Here, the audio data v1 is assumed to include only an environmental sound without including a speech sound by a person whose face is detected. On the other hand, the audio data v2 is assumed to include the speech sound by the person whose face is detected and the environmental sound. Accordingly, the difference V therebetween is assumed to exclude the environmental sound and include only the speech sound by the person whose face is detected.

The audio analysis unit 125 can transform the obtained difference V by a Fourier transform, and can specify a frequency distribution of the difference V obtained as its result as an audio component spoken by the person. Besides the above-described method, for example, it is possible to specify a speaking person by performing voiceprint analysis using a database in which voiceprints of a plurality of persons are registered. It is possible to specify a state of the speaking person by extracting the intonation, strength, accent, tone, or the like of the speech sound.

The audio analysis unit 125 can generate a character string from content by performing well-known audio recognition processing for a speech sound.

On the other hand, if a musical composition such as BGM is included in the obtained environmental sound, the audio analysis unit 125 can specify a name or genre of the included musical composition using a search server present on a network or the like. The audio analysis unit 125 can specify a type or origin of the included sound by performing waveform analysis using a database in which various sound waveforms are registered.

The audio analysis unit 125 can perform each processing in mutual cooperation with the image analysis unit 123 and the text analysis unit 127.

The audio analysis unit 125 outputs an analysis result of the audio data constituting the content to the scene metadata generating unit 129 to be described later. The audio analysis unit 125 may store the obtained analysis result in the storage unit 115 in the form of a database, a look-up table, or the like, and may store history information regarding the analysis result in the storage unit 115.

For example, the text analysis unit 127 is implemented by a CPU, a ROM, a RAM, a communication device, or the like. The text analysis unit 127 analyzes text (a character string) included in content using the real data of the content and the basic metadata output from the basic metadata extraction unit 121.

For example, the text analysis unit 127 extracts a character string displayed on a display screen as element data by analyzing caption information or a telop extracted by the basic metadata extraction unit 121. The text analysis unit 127 may specify speech content of a character by analyzing the audio recognition result extracted by the audio analysis unit 125.

The text analysis unit 127 can perform morphological analysis for a character string of caption information, a telop, or the like or a character string representing the audio recognition result, and can extract unique nouns from its result. It is possible to extract a name, a role, a set phrase, or the like of a person whose face is detected by analyzing the extracted unique nouns. When the morphological analysis of the character string is performed, the text analysis unit 127 uses various dictionary files stored in the storage unit 115 or the like. The text analysis unit 127 may perform syntactic analysis processing or semantic analysis processing, when necessary.

The text analysis unit 127 can specify a speaker of a character string included in a caption or the like using the analysis result of the image analysis unit 123 or the audio analysis unit 125. That is, a character string corresponding to a time when the mouth moves in a face detected by image analysis can be specified as speech content of a corresponding person.

The text analysis unit 127 outputs character string data included in content or an analysis result of character string data extracted from the content to the scene metadata generation unit 129 to be described later. The text analysis unit 127 may store the obtained analysis result in the form of a database, a look-up table, or the like in the storage unit 115, and may store history information regarding the analysis result in the storage unit 115.

According to this embodiment, the image analysis unit 123, the audio analysis unit 125, and the text analysis unit 127 can calculate the similarity of feature quantities calculated between scenes after calculating various feature quantities for an image, an audio sound, and text constituting each scene. Thereby, these analysis units can analyze a focused scene using analysis results for previously analyzed scenes. Here, the calculated feature quantities are not particularly limited. It is possible to carry out various calculations by applying well-known feature quantity calculation methods.

The image analysis unit 123, the audio analysis unit 125, and the text analysis unit 127 learn the analysis results using a machine learning technique, so that analysis processing may be performed in each processing unit.

For example, the scene metadata generation unit 129 is implemented by a CPU, a ROM, a RAM, a communication device, or the like. The scene metadata generation unit 129 generates scene metadata characterizing each scene constituting moving-image content using the analysis results respectively output from the image analysis unit 123, the audio analysis unit 125, and the text analysis unit 127. Thereby, scene metadata derived from image data constituting the moving-image content and scene metadata derived from audio data constituting the moving-image content are generated.

The scene metadata generation unit 129 outputs the generated scene metadata to the loss recovery information generation unit 109. It is preferable for the scene metadata generation unit 129 to store the generated scene metadata in the storage unit 115 or the like in the form of a database, a look-up table, or the like. Thereby, the scene metadata generation unit 129 can generate scene metadata of a focused scene using previously generated scene metadata.

An example of functions of the information processing device 10 according to this embodiment has been shown above. Each of the above-described components may be constituted using a general-purpose member or a circuit, or may be constituted by specialized hardware for functions of each component. All functions of each component may be performed by a CPU or the like. Accordingly, it is possible to appropriately change a configuration to be used in response to a technical level upon execution of this embodiment.

A computer program for implementing each function of the information processing device according to this embodiment as described above can be manufactured and mounted on a PC or the like. Also, a computer-readable recording medium storing the above-described computer program can be provided. The recording medium is, for example, a magnetic disk, an optical disc, a magneto-optical disc, a flash memory, or the like. The above-described computer program may also be distributed, for example, via a network without using a recording medium.

<Specific Example of Scene Metadata and Loss Recovery Information Generation Processing>

Figure 10:
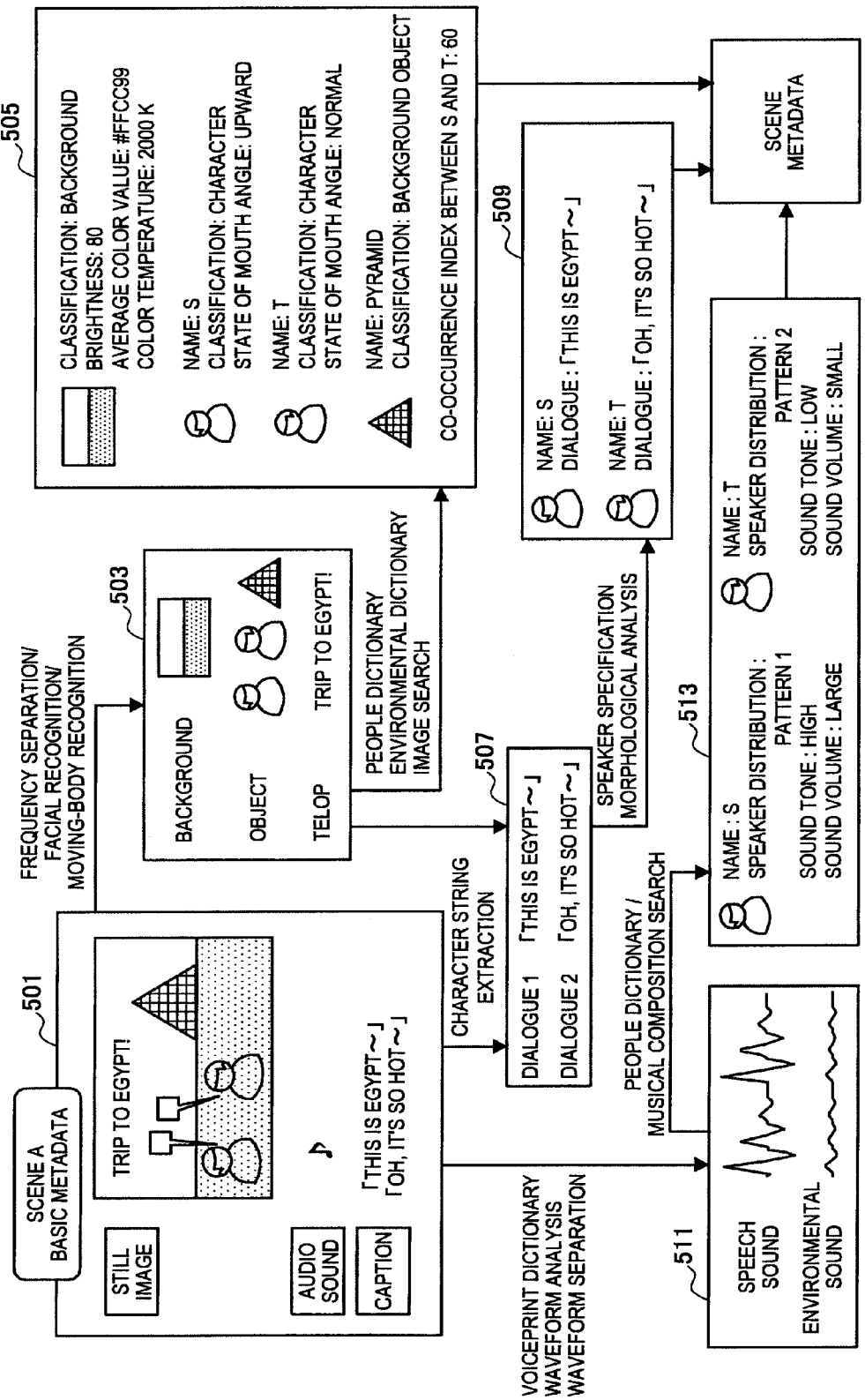
FIG. 10 is an illustrative diagram showing an example of scene metadata generation processing according to the same embodiment.
Figure 11:
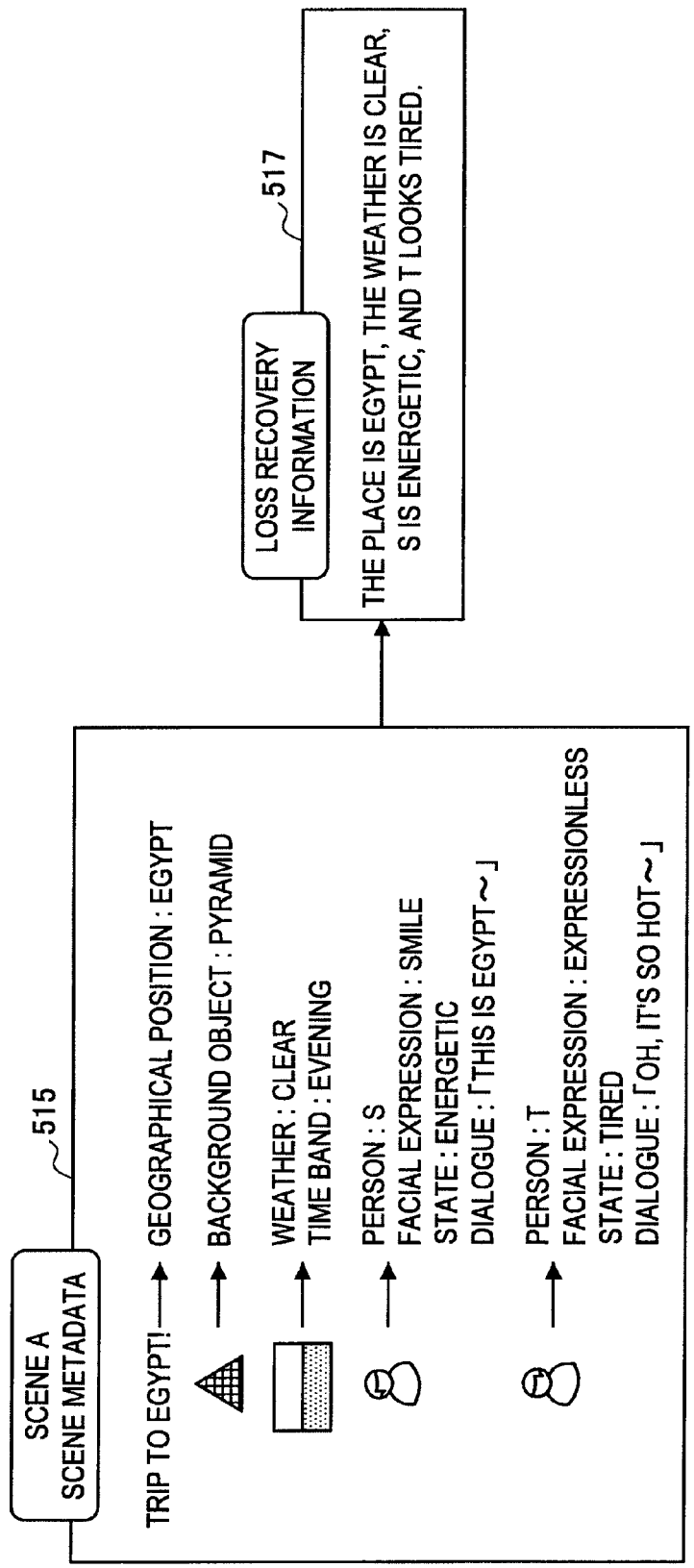
FIG. 11 is an illustrative diagram showing an example of loss recovery information generation processing according to the same embodiment.

Next, specific examples of processing of generating scene metadata and loss recovery information will be briefly described with reference to FIGS. 10 and 11. FIG. 10 is an illustrative diagram illustrating scene metadata generation processing, and FIG. 11 is an illustrative diagram illustrating loss recovery information generation processing.

Hereinafter, the basic metadata extraction unit 121 extracts basic metadata 501 as shown in FIG. 10 for scene A of certain moving-image content. In scene A, 2 persons are shown in a still image, and data corresponding to a conversation between the 2 persons and BGM are included as audio data. It is assumed that a telop of "Trip to Egypt!" is displayed in the still image, and caption information is included in content itself.

The image analysis unit 123 of the scene metadata extraction unit 103 performs various analysis processing such as frequency separation, facial recognition, moving-body recognition, and the like using the still image included in the extracted basic metadata 501. Thereby, the image analysis unit 123 can extract a string of information 503 including various objects or a background image included in the still image, or the like. Thereafter, the image analysis unit 123 extracts a string of element data 505 derived from image data from the extracted information 503 using a dictionary file of a people dictionary, an environmental dictionary, or the like or image search processing in the search server, or the like. The element data 505 includes various pieces of information as shown in FIG. 10.

When the extraction of the element data 505 is completed, the image analysis unit 123 outputs the extracted element data 505 to the scene metadata generation unit 129.

The text analysis unit 127 performs character string extraction processing using caption information included in the basic metadata 501, and extracts 2 types of dialogues 507. Thereafter, the text analysis unit 127 performs speaker specification processing and morphological analysis processing in cooperation with the image analysis unit 123 and the audio analysis unit 125, and extracts element data 509 derived from text included in the moving-image content. The element data 509 derived from the text includes information as shown in FIG. 10.

If the extraction of the element data 509 is completed, the text analysis unit 127 outputs the extracted element data 509 to the scene metadata generation unit 129.

The audio analysis unit 125 performs processing using a voiceprint dictionary, waveform analysis processing, waveform separation processing, and the like for audio data included in the basic metadata 501, and extracts data 511 regarding a speech sound and an environmental sound. Thereafter, element data 513 derived from audio data is extracted by performing processing using a people dictionary, musical composition search processing, or the like for each separated audio data. Various pieces of information as shown in FIG. 10 are included in the element data 513.

If the extraction of the element data 513 is completed, the audio analysis unit 125 outputs the extracted element data 513 to the scene metadata generation unit 129.

The scene metadata generation unit 129 generates scene metadata of scene A including scene metadata derived from image data and scene metadata derived from audio data using the element data respectively output from the image analysis unit 123, the audio analysis unit 125, and the text analysis unit 127.

The scene metadata generation unit 129 stores the scene metadata generated as described above in the storage unit 115 or the like, and also outputs the scene metadata to the loss recovery information generation unit 109.

Next, a specific example of loss recovery information generation processing will be described with reference to FIG. 11. In description of FIG. 11, it is assumed that moving-image content is converted into audio content.

The loss recovery information generation unit 109 specifies that various pieces of information potentially included in image data may be lost by referring to information indicating a reproduction mode output from the reproduction mode decision unit 107. Thereafter, the loss recovery information generation unit 109 generates loss recovery information regarding the scene A using scene metadata mainly derived from image data.

It is assumed that the scene metadata generation unit 129 generates scene metadata as shown in FIG. 11. In order to recover information included in image data, the loss recovery information generation unit 109 mainly generates loss recovery information using the scene metadata derived from image data. Thus, the loss recovery information generation unit 109 generates loss recovery information 517 as shown in FIG. 11. As shown in FIG. 11, the generated loss recovery information is a character string including information regarding a place, information regarding weather, and information regarding a facial expression of a character to be transmitted to the user by the original video.

By outputting the loss recovery information generated as described above, the information processing device 10 can transmit information that is likely to be lost by changing a reproduction mode of content to the user.

<Information Processing Method>

Subsequently, flows of various information processing methods that are performed by the information processing device 10 according to this embodiment will be briefly described with reference to FIGS. 12 to 15.

[Scene Metadata Extraction Processing]

Figure 12:
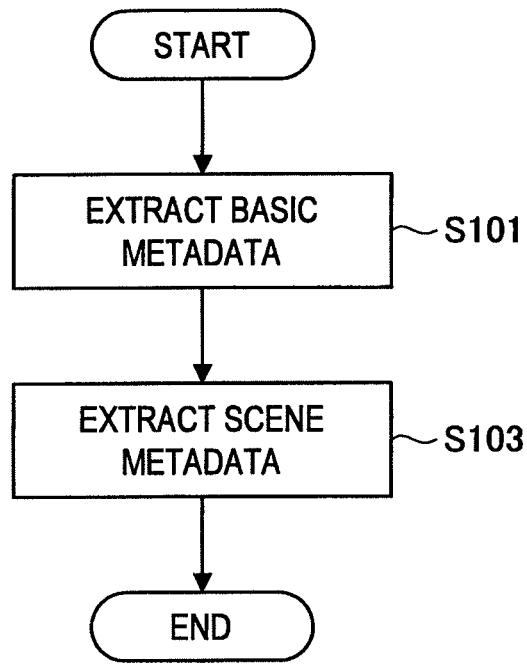
FIG. 12 is a flowchart showing an overall flow of a scene metadata extraction method according to the same embodiment.

First, an overall flow of the scene metadata extraction processing will be described with reference to FIG. 12. FIG. 12 illustrates the overall flow of the scene metadata extraction processing.

First, the basic metadata extraction unit 121 of the scene metadata extraction unit 103 extracts basic metadata as shown in FIG. 5 from moving-image content by analyzing the moving-image content (step S101). Thereafter, the scene metadata extraction unit 103 extracts scene metadata using the extracted basic metadata (step S103).

Figure 13:
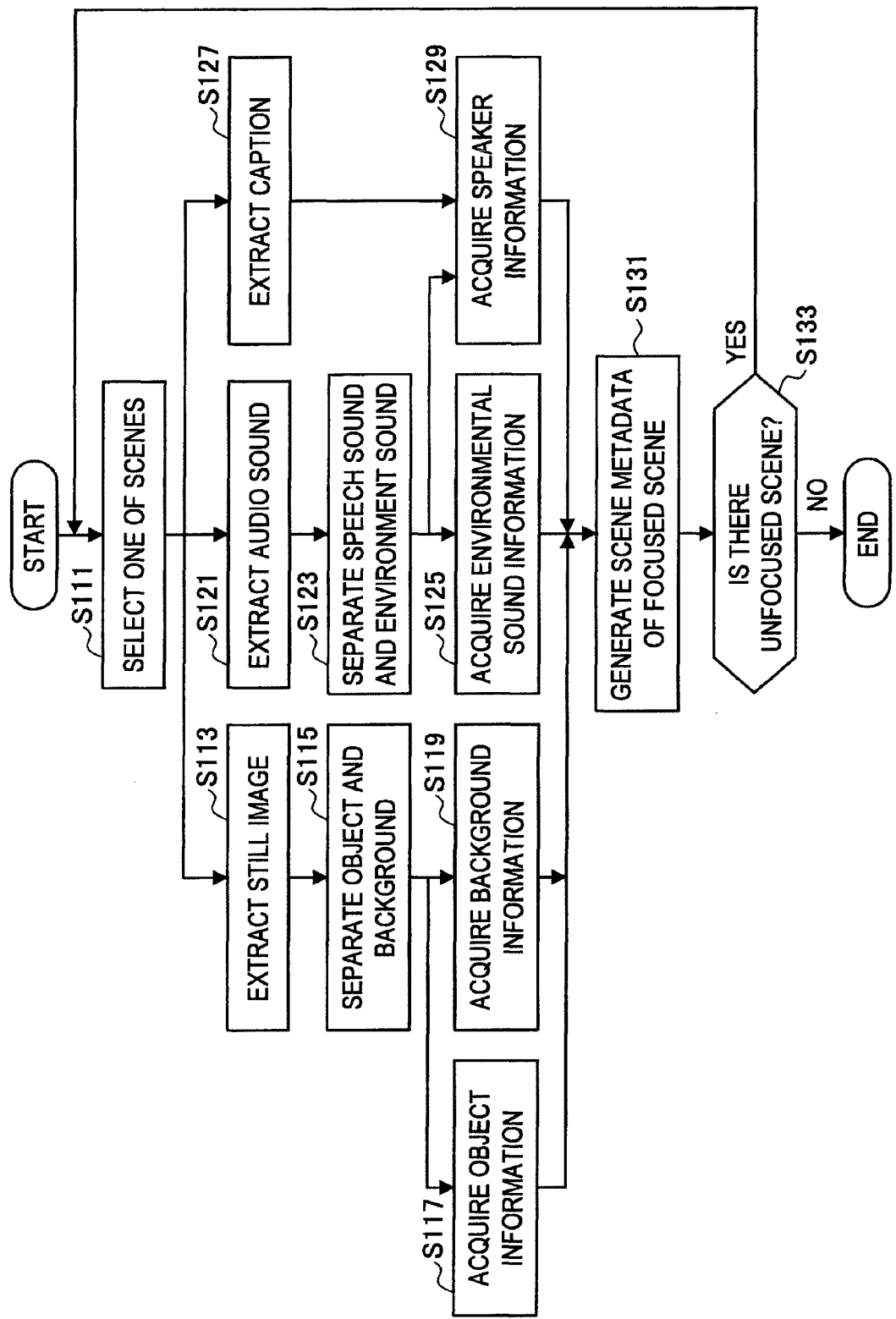
FIG. 13 is a flowchart showing a flow example of a scene metadata generation method according to the same embodiment.

Subsequently, the flow of scene metadata extraction processing that is performed by the scene metadata extraction unit 103 will be described with reference to FIG. 13. FIG. 13 is a flowchart showing the flow of the scene metadata extraction processing.

First, the scene metadata extraction unit 103 selects one of scenes constituting the moving-image content (step S111). Thereafter, the image analysis unit 123, the audio analysis unit 125, and the text analysis unit 127 perform analysis processing using basic metadata in the selected scene.

For example, the image analysis unit 123 extracts a still image included in the selected scene (step S113), and separates the still image into an object and a background (step S115). Thereafter, the image analysis unit 123 acquires object information using various analysis processing, a search server, or the like (step S117), and also acquires background information regarding a background image (step S119). Subsequently, the image analysis unit 123 outputs the acquired object information and background information to the scene metadata generation unit 129.

The audio analysis unit 125 extracts audio data corresponding to the selected scene (step S121), and separates the audio data into a speech sound and an environmental sound (step S123). Thereafter, the audio analysis unit 125 acquires environmental sound information from the separated environmental sound using various analysis processing, a search server, or the like (step S125). The audio analysis unit 125 outputs an analysis result of the audio data to the text analysis unit 127. Subsequently, the audio analysis unit 125 outputs information regarding the obtained environmental sound to the scene metadata generation unit 129.

The text analysis unit 127 extracts data regarding a caption or a telop corresponding to the selected scene (step S127). Thereafter, the text analysis unit 127 acquires information regarding a speaker appearing in the selected scene using an analysis result by the audio analysis unit 125 (step S129). Subsequently, the text analysis unit 127 outputs the acquired information regarding the speaker to the scene metadata generation unit 129.

The scene metadata generation unit 129 generates scene metadata of a focused scene using information output from each analysis unit (step S131). Thereafter, the scene metadata extraction unit 103 determines whether or not there is an unfocused scene in focused moving-image content (step S133). If there is an unfocused scene, the scene metadata extraction unit 103 continues processing by returning to step S111. If there is no unfocused scene, the scene metadata extraction unit 103 completes the scene metadata extraction processing.

[Content Reproduction Processing after Conversion]

Figure 14:
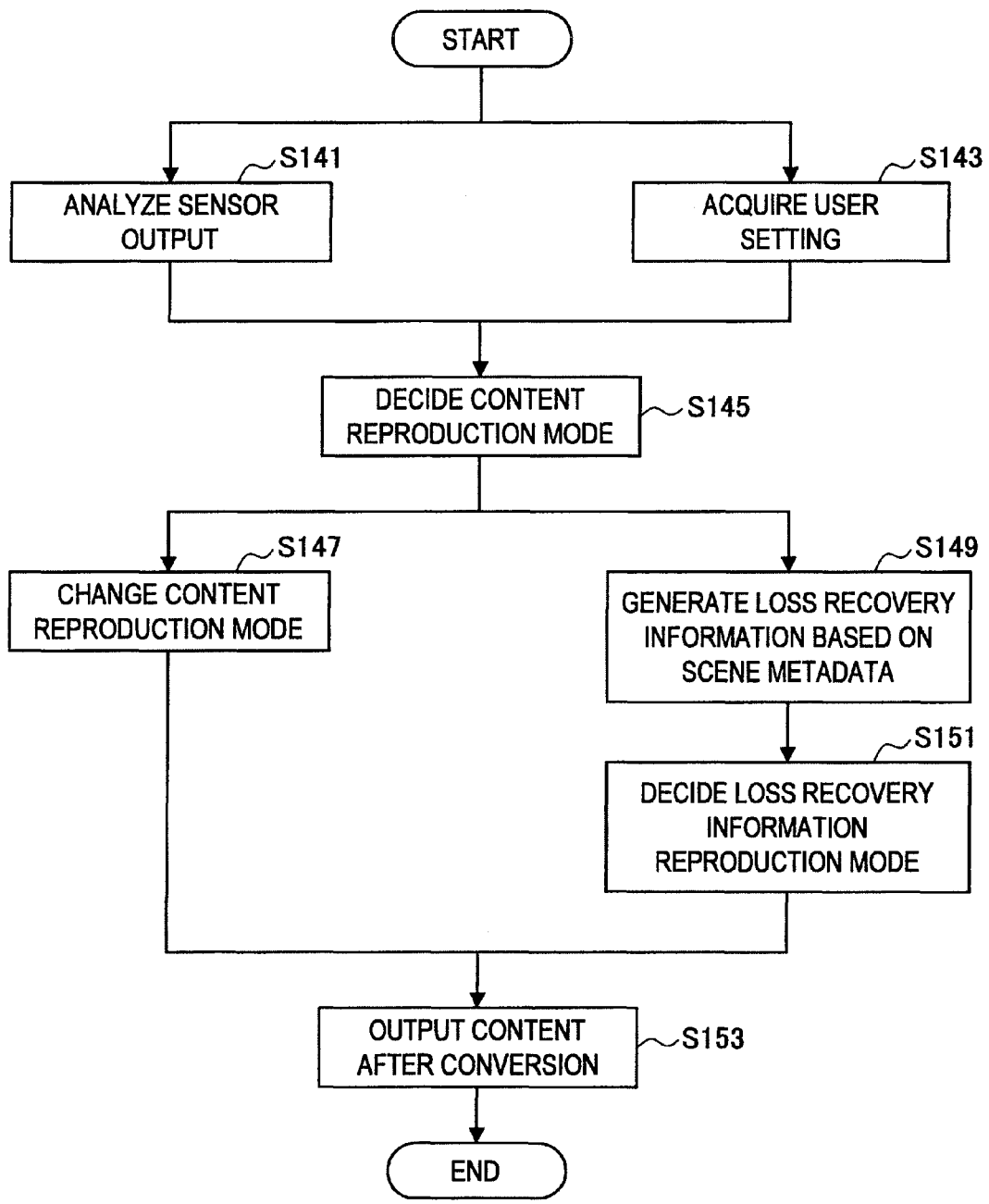
FIG. 14 is a flowchart showing a flow example of a content output method according to the same embodiment.

Subsequently, the flow of the content reproduction processing after conversion will be described with reference to FIG. 14. FIG. 14 is a flowchart showing the flow of the content reproduction processing after conversion.

Before description is given below, it is assumed that the scene metadata extraction unit 103 extracts scene metadata and outputs the extracted scene metadata to the loss recovery information generation unit 109.

First, the sensor output analysis unit 105 of the information processing device 10 acquires outputs (that is, sensor information) from various sensors provided in the information processing device 10 and analyzes the sensor information (step S141). Thereby, the sensor output analysis unit 105 generates sensing information obtained by analyzing the sensor information. Thereafter, the sensor output analysis unit 105 outputs the obtained sensing information to the reproduction mode decision unit 107.

The reproduction mode decision unit 107 acquires user settings (step S143), and also decides a content reproduction mode on the basis of the sensing information output from the sensor output analysis unit 105 and the acquired user settings (step S145).

If the reproduction mode is decided, the reproduction mode decision unit 107 outputs information indicating the decided reproduction mode to the loss recovery information generation unit 109, the content reproduction unit 111, and the loss recovery information output unit 113.

The content reproduction unit 111 changes the content reproduction mode on the basis of the information indicating the reproduction mode output from the reproduction mode decision unit 107 (step S147).

On the other hand, the loss recovery information generation unit 109 generates loss recovery information on the basis of the scene metadata extracted by the scene metadata extraction unit 103 and the content reproduction mode (step S149). Thereafter, the scene metadata extraction unit 103 decides the reproduction mode of the loss recovery information on the basis of the content reproduction mode (step S151).

Thereafter, the content reproduction unit 111 and the loss recovery information output unit 113 outputs content after conversion and the loss recovery information (step S153).

Thereby, the information processing unit 10 can transmit information that is likely to be lost by a change of the content reproduction mode to the user.

[Reproduction mode Decision Processing]

Figure 15:
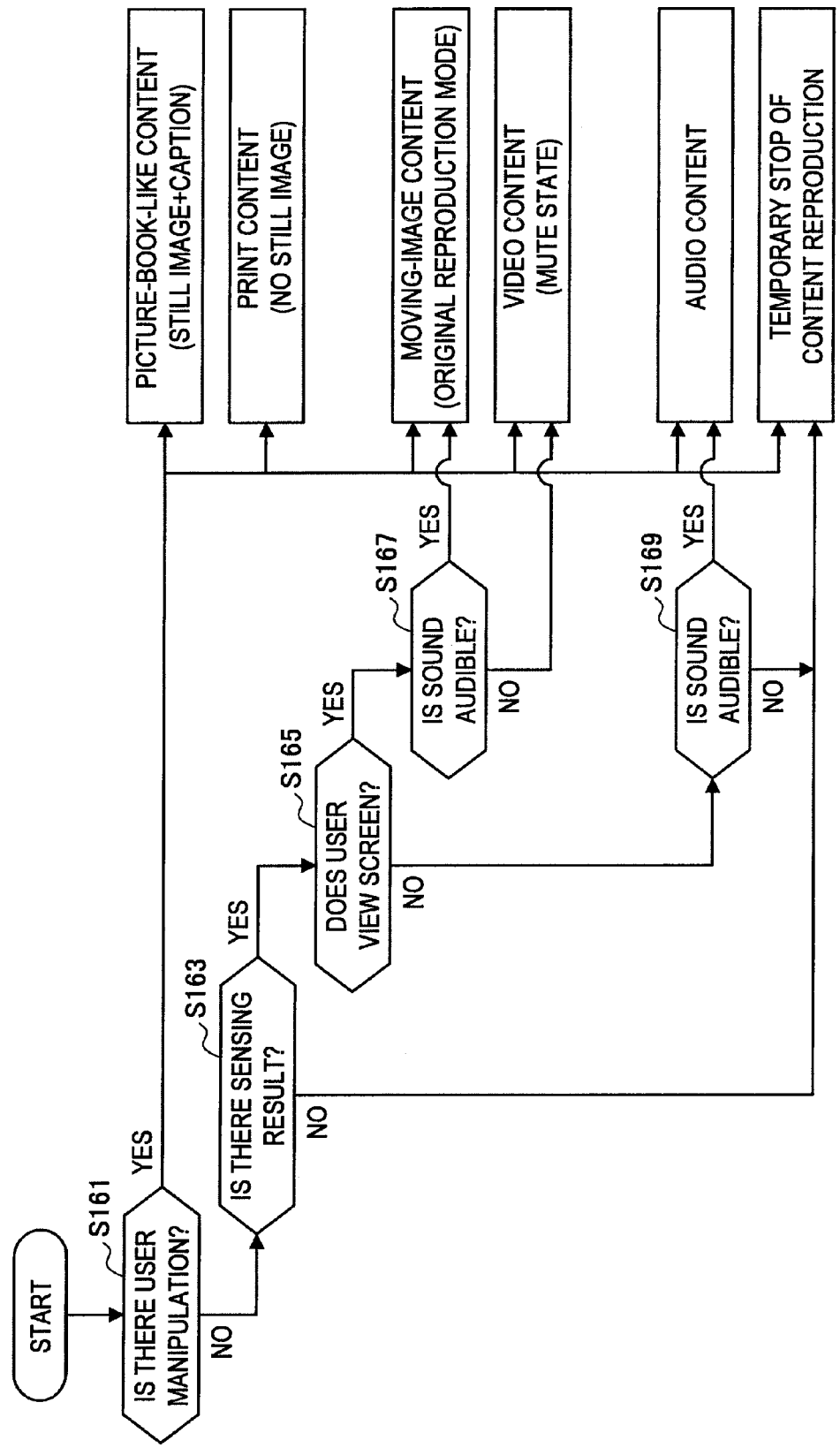
FIG. 15 is a flowchart showing a flow example of a reproduction mode decision method according to the same embodiment.

Subsequently, an example of the reproduction mode decision processing that is performed by the reproduction mode decision unit 107 will be briefly described with reference to FIG. 15. FIG. 15 is a flowchart showing an example of the reproduction mode decision processing that is performed by the reproduction mode decision unit 107.

First, the reproduction mode decision unit 107 determines whether or not user manipulation to the information processing device 10 is performed (step S161). If the user manipulation is performed, the reproduction mode decision unit 107 decides a content reproduction mode corresponding to the user manipulation as the content reproduction mode.

If no user manipulation is performed, the reproduction mode decision unit 107 determines whether or not there is sensing information indicating a sensing result (step S163). If there is no sensing information, the reproduction mode decision unit 107 temporarily stops content reproduction.

If there is sensing information, the reproduction mode decision unit 107 determines whether or not the user views a display screen of the information processing device 10 by referring to imaging data imaging the user's face (step S165).

If the user views the display screen, the reproduction mode decision unit 107 determines whether or not a sound is audible by referring to sensor information regarding a surrounding sound (step S167). If the sound is audible, the reproduction mode decision unit 107 determines a situation in which it is preferable to output an audio sound, and decides the reproduction mode so that reproduction is performed without converting moving-image content (directly in the original reproduction mode). If no sound is audible, the reproduction mode decision unit 107 determines a situation in which it is preferable not to output an audio sound, and decides the reproduction mode so that the moving-image content is reproduced in a mute state.

On the other hand, if the user does not view the display screen, the reproduction mode decision unit 107 determines whether or not the sound is audible by referring to the sensor information regarding the surrounding sound (step S169). If the sound is audible, the reproduction mode decision unit 107 determines a situation in which it is preferable to output an audio sound, and decides the reproduction mode so that the moving-image content is reproduced as audio content. If no sound is audible, the reproduction mode decision unit 107 temporarily stops the content reproduction.

The information processing device and the information processing method according to the embodiments of the present invention have been described above.

Second Embodiment

Subsequently, an information processing system according to a second embodiment of the present invention will be described. The case where the extraction of scene metadata and the generation of loss recovery information are performed within one device has been described in the first embodiment of the present invention, but the case where scene metadata extraction processing and loss recovery information generation processing are performed in different devices will be described in the second embodiment.

<Information Processing System>

Figure 16:
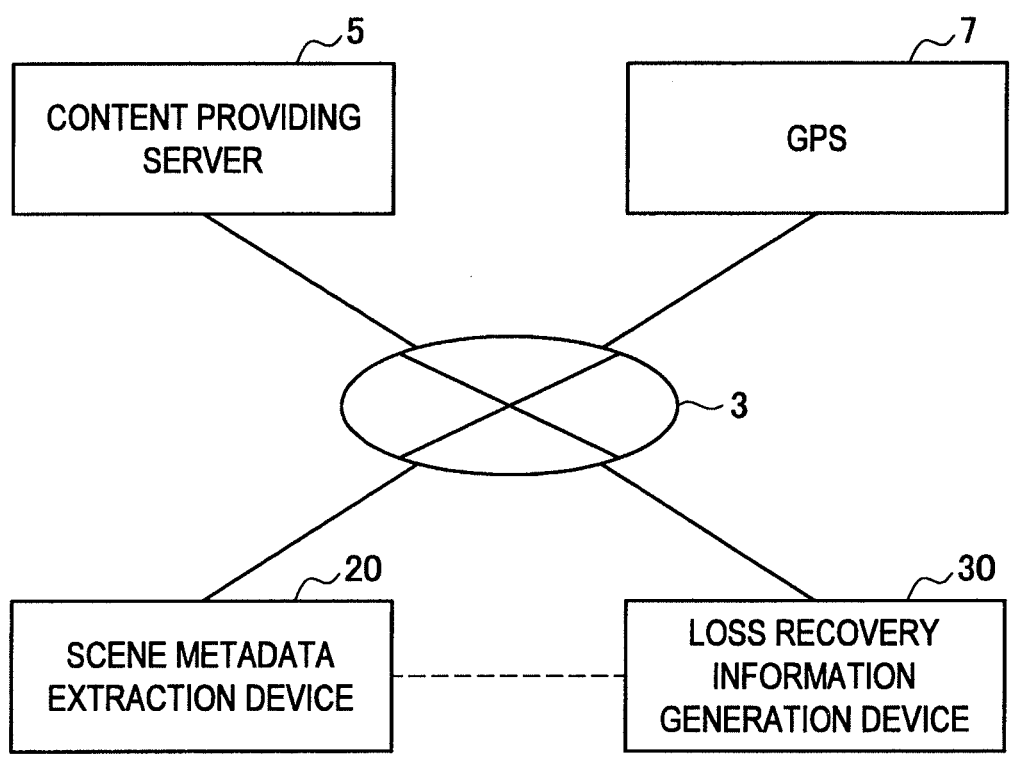
FIG. 16 is an illustrative diagram showing an information processing system according to a second embodiment of the present invention.

First, a configuration of the information processing system according to this embodiment will be described with reference to FIG. 16. FIG. 16 is an illustrative diagram showing the information processing system according to this embodiment.

As shown in FIG. 16, an information processing system 1 according to this embodiment at least includes a network 3 and a content providing server 5, a GPS 7, a scene metadata extraction device 20, and a loss recovery information generation device 30 communicable with each other by the network 3.

Here, since the network 3, the content providing server 5, and the GPS 7 have the same configurations and effects as the network 3, the content providing server 5, and the GPS 7 according to the first embodiment of the present invention, detailed description thereof is omitted hereinafter.

The scene metadata extraction device 20 is a device that extracts scene metadata of corresponding moving-image content from the moving-image content acquired from the content providing server 5 or the like. The scene metadata extraction device 20 provides the extracted scene metadata to the loss recovery information generation device 30. Thereby, the loss recovery information generation device 30 to be described later may generate loss recovery information for recovering information that is likely to be lost due to a change of a content reproduction mode using the scene metadata extracted by the scene metadata extraction device 20.

The loss recovery information generation device 30 generates loss recovery information for recovering information that is likely to be lost due to a change of a reproduction mode of the moving-image content using the scene metadata extracted by the scene metadata extraction device 20. The loss recovery information generation device 30 can reproduce the content while changing the reproduction mode of the moving-image content using the generated loss recovery information.

The scene metadata extraction device 20 and the loss recovery information generation device 30 may be connected to each other via the network 3, or may be directly connected via a predetermined cable.

The scene metadata extraction device 20 and the loss recovery information generation device 30 according to this embodiment may be implemented as a PC or computers of various servers or the like, or may be implemented as a portable electronic device such as a portable music player, a portable gaming machine, a mobile phone, a smart phone, a PDA, or a touch screen tablet. The scene metadata extraction device 20 and the loss recovery information generation device 30 according to this embodiment may be implemented as various recorders such as a television, a DVD recorder, a Blu-ray recorder, and the like.

The information processing system 1 according to this embodiment has been briefly described. The information processing system 1 according to this embodiment may include a search engine capable of searching for various pieces of information, a search server that manages a database, or the like.

<Configuration of Scene Metadata Extraction Device>

Figure 17:
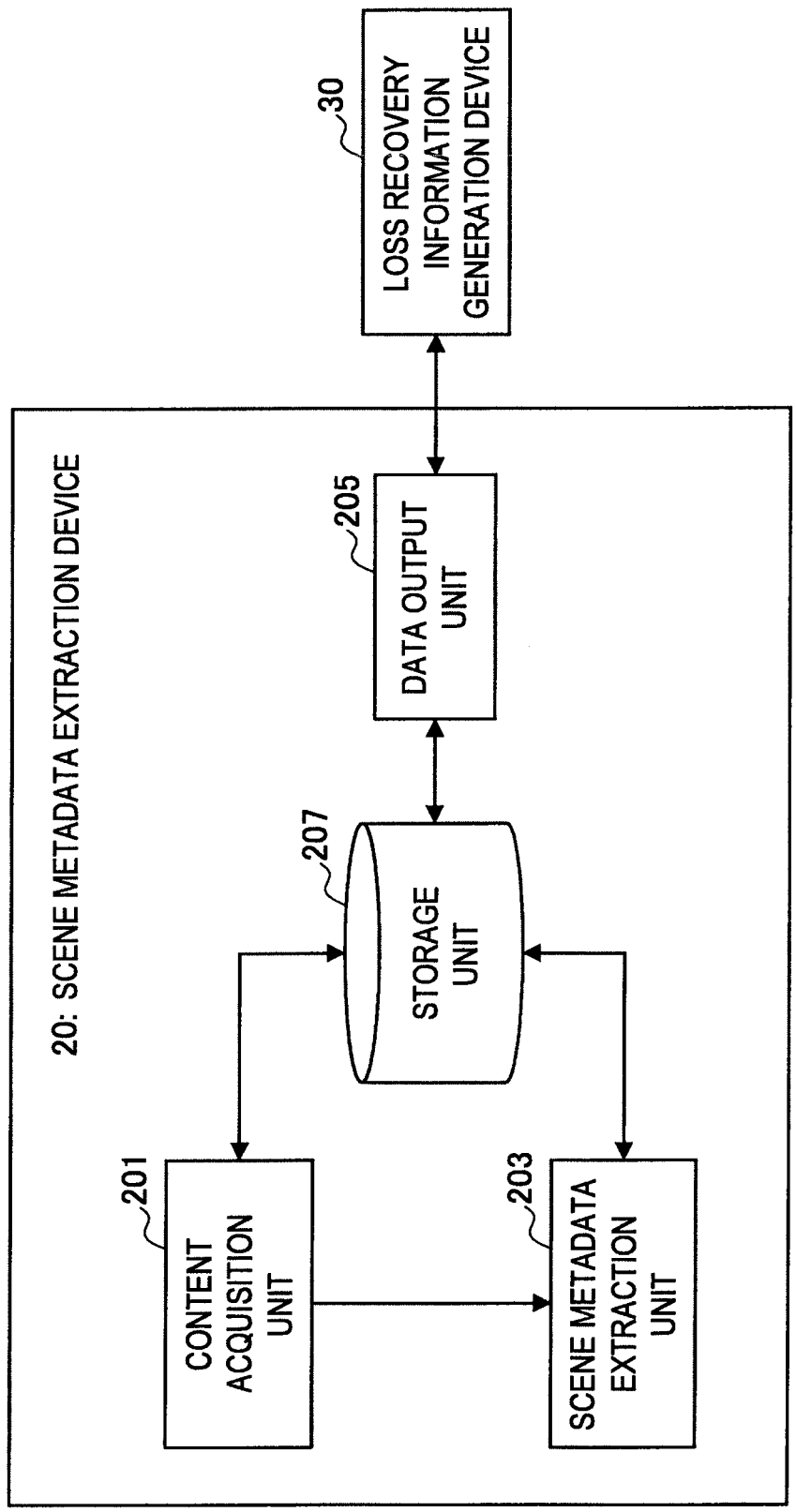
FIG. 17 is a block diagram showing a configuration of a scene metadata extraction device according to the same embodiment.

Subsequently, a configuration of the scene metadata extraction device 20 according to this embodiment will be described with reference to FIG. 17. FIG. 17 is a block diagram showing the configuration of the scene metadata extraction device 20 according to this embodiment.

As shown in FIG. 17, the scene metadata extraction device 20 according to this embodiment mainly includes a content acquisition unit 201, a scene metadata extraction unit 203, a data output unit 205, and a storage unit 207.

Here, since the content acquisition unit 201 and the storage unit 207 according to this embodiment have the same configurations and effects as the processing units according to the first embodiment, detailed description thereof is omitted hereinafter.

Since the scene metadata extraction unit 203 according to this embodiment has the same configurations and effects as the scene metadata extraction unit 103, except for an operation of storing extracted scene metadata in the storage unit 207, detailed description thereof is omitted hereinafter.

For example, the data output unit 205 is implemented by a CPU, a ROM, a RAM, a communication device, or the like. The data output unit 205 outputs the scene metadata, which is extracted by the scene metadata extraction 203 and stored in the storage unit 207, to the loss recovery information generation device 30 in response to a scene metadata transmission request from the loss recovery information device 30.

The data output unit 205 may directly acquire the scene metadata from the scene metadata extraction 203, not from the storage unit 207.

An example of functions of the scene metadata extraction device 20 according to this embodiment has been shown above. Each of the above-described components may be constituted using a general-purpose member or a circuit, or may be constituted by specialized hardware for functions of each component. All functions of each component may be performed by a CPU or the like. Accordingly, it is possible to appropriately change a configuration to be used in response to a technical level upon execution of this embodiment.

A computer program for implementing each function of the scene metadata extraction device according to this embodiment as described above can be manufactured and mounted on a PC or the like. Also, a computer-readable recording medium storing the above-described computer program can be provided. The recording medium is, for example, a magnetic disk, an optical disc, a magneto-optical disc, a flash memory, or the like. The above-described computer program may also be distributed, for example, via a network without using a recording medium <Configuration of Loss Recovery Information Generation Device>

Figure 18:
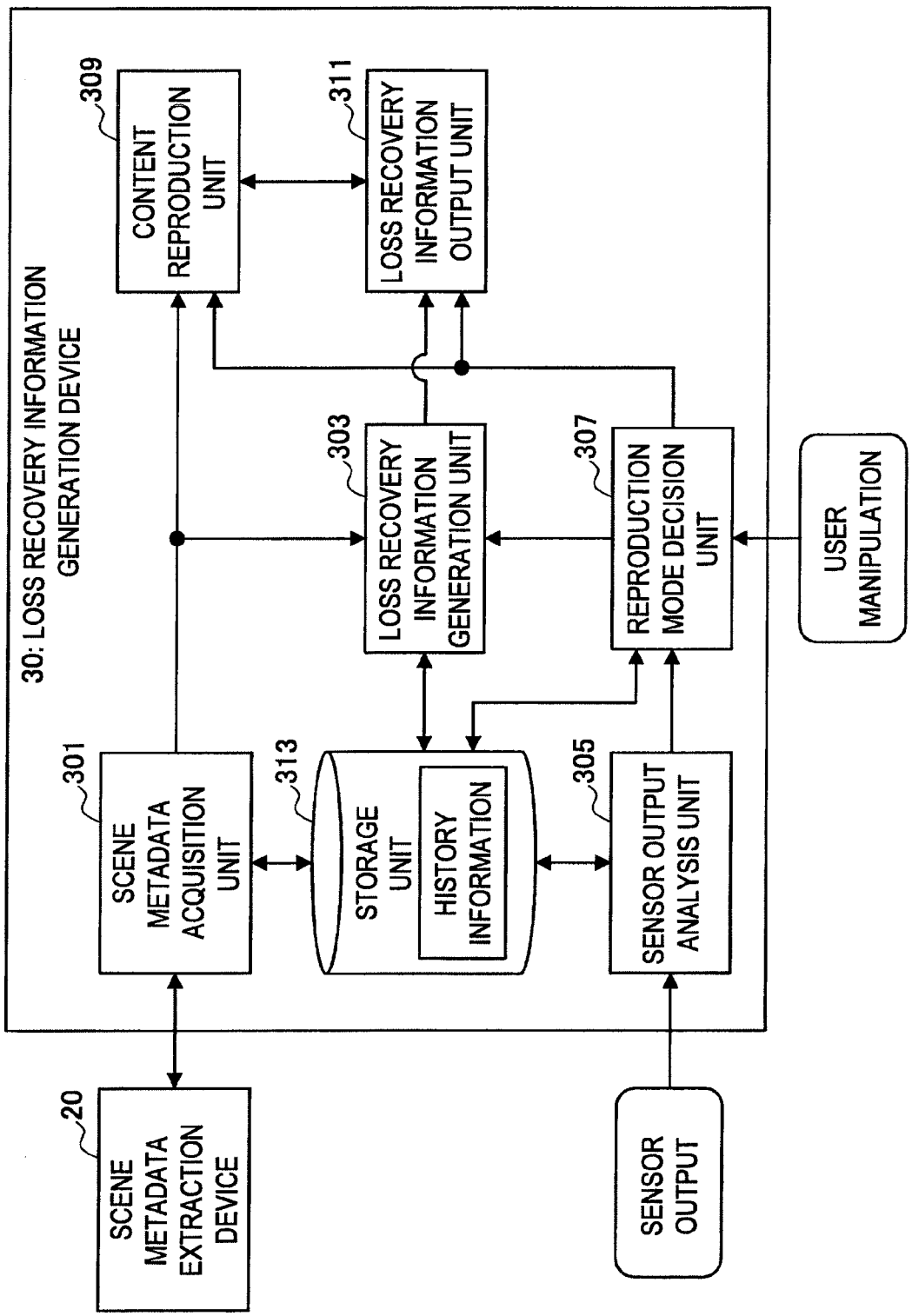
FIG. 18 is a block diagram showing a configuration of a loss recovery information generation device according to the same embodiment.

Subsequently, a configuration of the loss recovery information generation device 30 according to this embodiment will be described with reference to FIG. 18. FIG. 18 is a block diagram showing the configuration of the loss recovery information generation device 30 according to this embodiment.

The loss recovery information generation device 30 according to this embodiment mainly includes a scene metadata acquisition unit 301, a loss recovery information generation unit 303, a sensor output analysis unit 305, a reproduction mode decision unit 307, a content reproduction unit 309, a loss recovery information output unit 311, and a storage unit 313.

For example, the scene metadata acquisition unit 301 is implemented by a CPU, a ROM, a RAM, a communication device, or the like. The scene metadata acquisition unit 301 requests the scene metadata extraction unit 20 to transmit scene metadata, and acquires the scene metadata from the scene metadata extraction device 20. The scene metadata acquisition unit 301 outputs the acquired scene metadata to the loss recovery information generation unit 303.

The scene metadata acquisition unit 301 may acquire real data of moving-image data, metadata of the corresponding moving-image content, or the like from the content providing server 5, the scene metadata extraction device 20, or the like. In this case, the scene metadata acquisition unit 301 may output the real data of the moving-image content to the content reproduction unit 309, and may also output the content metadata to the loss recovery information generation unit 303.

Since the loss recovery information generation unit 303, the sensor output analysis unit 305, the reproduction mode decision unit 307, the content reproduction unit 309, the loss recovery information output unit 311, and the storage unit 313 have the same configurations and effects as the processing units according to the first embodiment, detailed description thereof is omitted.

An example of functions of the loss recovery information generation device 30 according to this embodiment has been shown above. Each of the above-described components may be constituted using a general-purpose member or a circuit, or may be constituted by specialized hardware for functions of each component. All functions of each component may be performed by a CPU or the like. Accordingly, it is possible to appropriately change a configuration to be used in response to a technical level upon execution of this embodiment.

A computer program for implementing each function of the loss recovery information generation device according to this embodiment as described above can be manufactured and mounted on a PC or the like. Also, a computer-readable recording medium storing the above-described computer program can be provided. The recording medium is, for example, a magnetic disk, an optical disc, a magneto-optical disc, a flash memory, or the like. The above-described computer program may also be distributed, for example, via a network without using a recording medium.

Hardware Configuration

Figure 19:
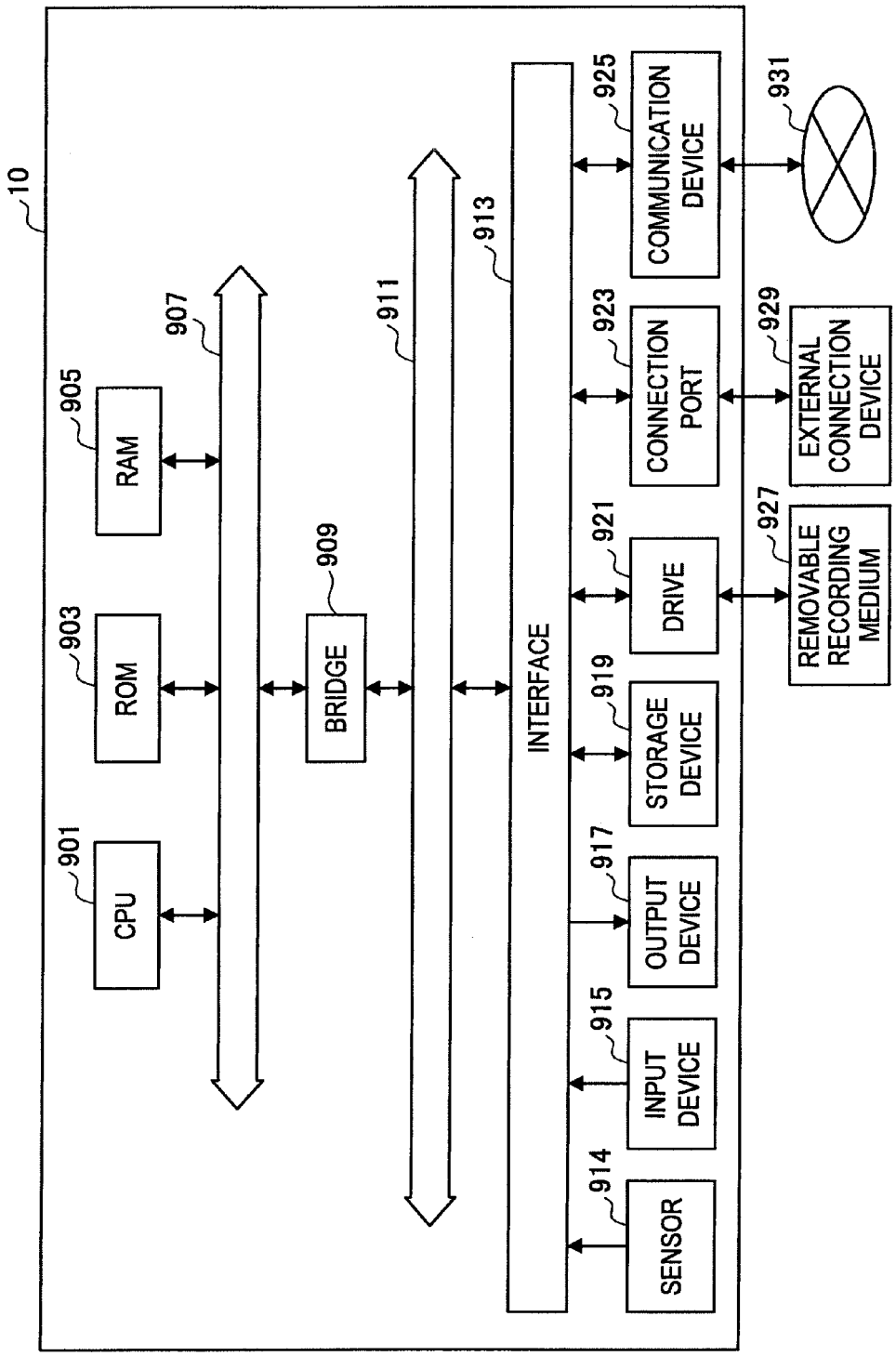
FIG. 19 is a block diagram showing a hardware configuration of the information processing device according to an embodiment of the present invention.

Next, the hardware configuration of the information processing apparatus 10 according to the embodiment of the present invention will be described in detail with reference to FIG. 19. FIG. 19 is a block diagram for illustrating the hardware configuration of the information processing apparatus 10 according to the embodiment of the present invention.

The information processing apparatus 10 mainly includes a CPU 901, a ROM 903, and a RAM 905. Furthermore, the information processing apparatus 10 also includes a host bus 907, a bridge 909, an external bus 911, an interface 913, an sensor 914, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The sensor 914 is a detection means such as a sensor that senses a motion of the user, and a sensor that acquires information representing a current position. As one example of such sensor, a three-axis acceleration sensor including an acceleration sensor, a gravity detection sensor, a fall detection sensor, and the like, a three-axis gyro sensor including an angular velocity sensor, a hand-blur compensation sensor, a geomagnetic sensor, and the like, or a GPS sensor, or the like can be listed. Further, the sensor 914 may be equipped with various measurement apparatuses other than the above described, such as a thermometer, an illuminometer, a hygrometer, or the like.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication Heretofore, an example of the hardware configuration capable of realizing the functions of the information processing apparatus 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

Since the scene metadata extraction device 20 and the loss recovery information generation device 30 according to the second embodiment of the present invention have the same hardware configuration and effect as the information processing device 10 according to the first embodiment, detailed description thereof is omitted.

SUMMARY

According to the embodiments of the present invention as described above, information loss due to a change of a reproduction mode can be suppressed. A reproduction mode of moving-image content can be freely and dynamically selected/changed in response to an audiovisual environment or a reproduction device of the user. The user can view content at his/her own pace by converting moving-image content into picture-book-like content or the like.

Preferred embodiments of the present invention have been described above in detail with reference to the appended drawings, but the present invention is not limited thereto. It should be understood by those skilled in the art that various modifications, combinations, sub-combinations and alterations may occur depending on design requirements and other factors insofar as they are within the scope of the appended claims or the equivalents thereof.

For example, an example of moving-image content has been described in the above embodiments, but the present invention is applicable to data in which part of original information of the data is lost by a change of a data format, besides the moving-image content.

The present application contains subject matter related to that disclosed in Japanese Priority Patent Application JP 2010-108223 filed in the Japan Patent Office on May 10, 2010, the entire content of which is hereby incorporated by reference.

What is claimed is:

1. An information processing method comprising the steps of:
    analyzing moving-image content including image data and audio data and extracting scene metadata characterizing each scene for each scene constituting the moving-image content;
    deciding a reproduction mode of the moving-image content according to at least one of a reproduction environment of the moving-image content and setting information set by a user;
    generating loss recovery information for recovering loss information lost by changing the reproduction mode of the moving-image content using the scene metadata according to the decided reproduction mode; and
    outputting the generated loss recovery information in accordance with the moving-image content to be reproduced in the decided reproduction mode.

2. The information processing method according to claim 1, wherein, in the step of extracting the scene metadata, first metadata is extracted from the moving-image content, and the scene metadata derived from the image data and the scene metadata derived from the audio data are extracted using the first metadata.

3. The information processing method according to claim 2, wherein, in the step of generating the loss recovery information, the loss recovery information is generated mainly using scene metadata derived from data that is not output by a change of the reproduction mode.

4. The information processing method according to claim 1, wherein the reproduction environment of the moving-image content is decided on the basis of a sensor output, which is output from at least one of a camera that images the user or a surrounding environment, a sound collecting microphone that acquires a surrounding environmental sound, a sensor that senses a motion of the user, and a sensor that acquires information representing a current position.

5. The information processing method according to claim 1, wherein, in the step of outputting the loss recovery information, an output mode is decided when the loss recovery information is output according to the reproduction mode.

6. An information processing device comprising:
    a scene metadata extraction unit for analyzing moving-image content including image data and audio data, and extracting scene metadata characterizing each scene for each scene constituting the moving-image content;
    a reproduction mode decision unit for deciding a reproduction mode of the moving-image content according to at least one of a reproduction environment of the moving-image content and setting information set by a user;
    a loss recovery information generation unit for generating loss recovery information for recovering loss information lost by changing the reproduction mode of the moving-image content using the scene metadata according to the reproduction mode decided by the reproduction mode decision unit; and a loss recovery information output unit for outputting the loss recovery information generated by the loss recovery information generation unit in accordance with the moving-image content to be reproduced in the reproduction mode decided by the reproduction mode decision unit.

7. A loss recovery information generation device comprising:
   a scene metadata acquisition unit for acquiring scene metadata characterizing each scene constituting moving-image content including image data and audio data;
   a reproduction mode decision unit for deciding a reproduction mode of the moving-image content according to at least one of a reproduction environment of the moving-image content and setting information set by a user;
   a loss recovery information generation unit for generating loss recovery information for recovering loss information lost by changing the reproduction mode of the moving-image content using the scene metadata according to the reproduction mode decided by the reproduction mode decision unit; and
   a loss recovery information output unit for outputting the loss recovery information generated by the loss recovery information generation unit in accordance with the moving-image content to be reproduced in the reproduction mode decided by the reproduction mode decision unit.

8. A non-transitory computer readable storage device storing a computer program, the program which when executed by a computer, performs an information processing method, the method comprising:
   analyzing moving-image content including image data and audio data, and extracting scene metadata characterizing each scene for each scene constituting the moving-image content;
   deciding a reproduction mode of the moving-image content according to at least one of a reproduction environment of the moving-image content and setting information set by a user;
   generating loss recovery information for recovering loss information lost by changing the reproduction mode of the moving-image content using the scene metadata according to the reproduction mode decided by the reproduction mode decision function; and
   outputting the loss recovery information generated by the loss recovery information generation function in accordance with the moving-image content to be reproduced in the reproduction mode decided by the reproduction mode decision function.

9. A non-transitory computer readable storage device storing a computer program, the program which when executed by a computer, performs an information processing method, the method comprising:
   acquiring scene metadata characterizing each scene constituting moving-image content including image data and audio data;
   deciding a reproduction mode of the moving-image content according to at least one of a reproduction environment of the moving-image content and setting information set by a user;
   generating loss recovery information for recovering loss information lost by changing the reproduction mode of the moving-image content using the scene metadata according to the reproduction mode decided by the reproduction mode decision function; and
   outputting the loss recovery information generated by the loss recovery information generation function in accordance with the moving-image content to be reproduced in the reproduction mode decided by the reproduction mode decision function.

* * * * *